(12) United States Patent
Donoghue et al.

(10) Patent No.: US 9,118,432 B2
(45) Date of Patent: Aug. 25, 2015

(54) SYSTEMS AND METHODS FOR REAL TIME MEDIA CONSUMPTION FEEDBACK

(75) Inventors: Patrick J. Donoghue, Sea Cliff, NY (US); Jonathan Greenfield, Miller Place, NY (US); Wilton J. Hildenbrand, Jr., Smithtown, NY (US); Kristin A. Dolan, Oyster Bay, NY (US); Jean A. Adams, Amityville, NY (US); Melissa R. Stuhl, Woodbury, NY (US)

(73) Assignee: CSC HOLDINGS, LLC, Bethpage, NY (US)

( * ) Notice: Subject to any disclaimer, the term of this patent is extended or adjusted under 35 U.S.C. 154(b) by 868 days.

(21) Appl. No.: 13/077,700

(22) Filed: Mar. 31, 2011

(65) Prior Publication Data
US 2012/0254910 A1    Oct. 4, 2012

(51) Int. Cl.
| | |
|---|---|
| H04H 60/33 | (2008.01) |
| H04H 60/43 | (2008.01) |
| H04H 60/31 | (2008.01) |
| H04H 60/64 | (2008.01) |
| H04H 60/65 | (2008.01) |
| H04H 60/51 | (2008.01) |

(52) U.S. Cl.
CPC .............. *H04H 60/31* (2013.01); *H04H 60/64* (2013.01); *H04H 60/65* (2013.01); *H04H 60/51* (2013.01)

(58) Field of Classification Search
USPC ............................. 725/14, 34, 35, 38, 39, 46
See application file for complete search history.

(56) References Cited

U.S. PATENT DOCUMENTS

| | | | | |
|---|---|---|---|---|
| 6,904,610 | B1 * | 6/2005 | Bayrakeri et al. | 725/54 |
| 7,363,643 | B2 * | 4/2008 | Drake et al. | 725/34 |
| 7,856,485 | B2 * | 12/2010 | Prager et al. | 709/219 |
| 2007/0201300 | A1 * | 8/2007 | Chen | 365/233 |

\* cited by examiner

*Primary Examiner* — Kieu Oanh T Bui
(74) *Attorney, Agent, or Firm* — Sterne Kessler Goldstein & Fox P.L.L.C.

(57) ABSTRACT

Systems and methods for providing users with a real time or near-real time indications of media channels or programs that are currently receiving the most usage or consumption within a defined population of users are disclosed. In an embodiment, a method receives media usage data for currently airing media while the media is being aired and creates an ordered list of media channels or programs for presentation, based at least in part on the media usage data. The method then presents the ordered list of media channels or programs while the media is being aired. In an embodiment, a system further provides the ability to easily select and tune one of the indicated channels or programs in an interactive interface. In an embodiment, the selected media channels or programs are sold on demand or as part of a service upgrade if they are not included in a user's current subscription.

42 Claims, 11 Drawing Sheets

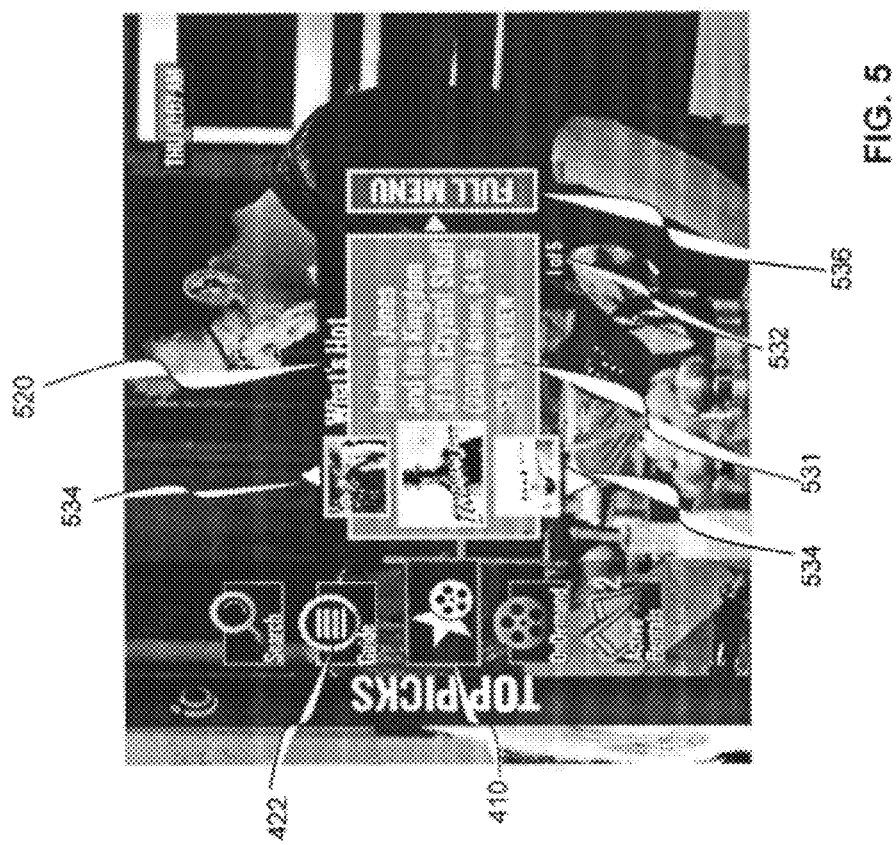
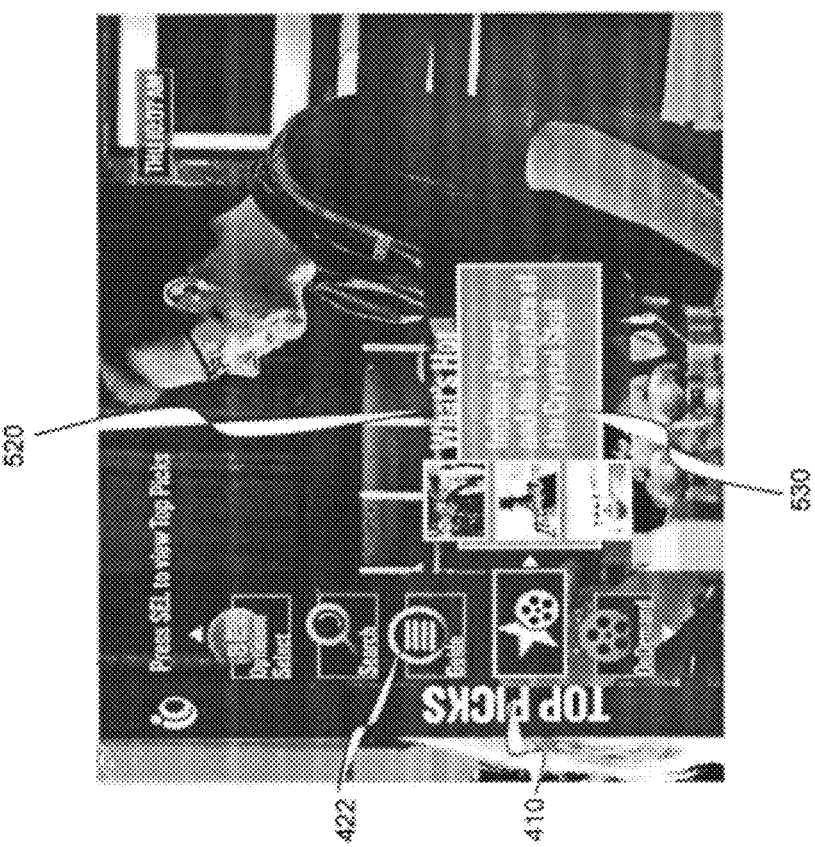
FIG. 5

SYSTEMS AND METHODS FOR REAL TIME MEDIA CONSUMPTION FEEDBACK

FIELD OF THE INVENTION

Embodiments of the invention relate to viewing and selecting media. More specifically, embodiments of the invention relate to providing users with a real time or near-real time indication of channels or programs that are currently receiving the most viewership within a defined population of users and enabling selection and tuning one of the indicated channels or programs.

BACKGROUND OF THE INVENTION

Historically, lists of popular media have typically been provided on a retrospective basis. That is, media popularity is measured for some prior period, such as a day, a week or even a month earlier, and then subsequently published for review by others. While this is useful for consumers in planning future media consumption, it falls short in assisting users in quickly identifying and choosing among current, real time media consumption, such as, for example, which of hundreds of currently airing television programs may be of interest to watch right now.

For example, in conventional cable television systems, subscribers and users have limited interaction with a set top box (STB) to access the services and channels they subscribe to. Generally, this access is provided through a run-time environment or user interface (UI). While conventional STB UIs display schedule information, they do not have the ability to display real time usage data of channels or programs currently being watched.

Accordingly, what is needed is a system that enables real time or near-real time feedback of media consumption patterns occurring for media that is presently available, that enables a user to select media to view based on popularity of the media.

BRIEF SUMMARY OF THE INVENTION

The invention comprises a system that gathers real time or near-real time usage data for media, and then publishes a portion of that information, reflecting the most popular media. The media usage information is published while the real time media is still available for consumption by a user.

For example, in an embodiment, an agent in a cable television system periodically polls all or a sample set of set-top boxes within a defined population or area to obtain information on whether the set-top box is currently being used to view a linear broadcast television channel, and if so, which channel. Alternatively, the set-top boxes may periodically post said information to said agent. According to an embodiment, the polling period can be very frequent, measured in minutes or even seconds, in order to facilitate near-real time feedback to users. An embodiment of the invention updates media usage data in real time as additional set top boxes tune into channels and/or select programs.

The agent subsequently aggregates the user data to identify the most popular channels and programs. For example, the system may identify the 20 channels currently tuned by the largest number of set-top boxes.

The identified most popular channel information is then published to users via a graphical user interface (GUI). According to an embodiment, the most popular channel information is displayed in a GUI directly via set-top boxes used to watch television channels. In an embodiment, the most popular channels are presented as a sorted list, in descending order of popularity, and the user interface enables a user to select among the channels in the list, and click to tune a selected channel.

In an embodiment, the system may use electronic program guide data to first correlate channels to the programs currently airing, and then publish a list of the most popular programs, rather than a list of the most popular channels.

In an embodiment, the system may additionally aggregate like channels before ranking them. For example, the system may combine the standard definition and high definition versions of a channel, for the purpose of ranking popularity of programs. In an embodiment, the system may then publish only a single entry for the associated program, and may use information about the set-top box, or the user, to tune the most appropriate version of the program, when selected by the user. For example, the system may automatically tune the associated standard definition channel if the set-top box is not capable of tuning high definition channels, while tuning the associated high definition channel on a set-top box that is capable of tuning such channels.

In an embodiment of the invention, the system may report popularity aggregated across all users or set-top boxes participating in the system. In another embodiment, the system may segregate the users into multiple separate groups, such as by geographic region or by demographic clustering, and separately aggregate and report popularity to users based solely on usage within their defined group.

In one embodiment, the system may report popularity aggregated across all tiers of services, including for example, basic, extended basic or family, and premium tiers of service. However, this approach may tend to bias popularity rankings for the most commonly available content, such as the over-the-air broadcast stations carried on the basic tier.

Accordingly, in another embodiment, the system may report popularity segregated by service tier, so that, for example, premium tier subscribers see the popularity of programs among subscribers to the same or a similar tier, providing a potentially more "fair" reflection of the popularity of premium content that is less widely available among the general population of users.

In still another embodiment, the system may weight different channels differently, to adjust for differences in availability of the various channels. For example, the viewership of each channel may be normalized based on the subscribership to a given channel, so that the popularity rankings reflect the percentage of viewers with access to the channel who choose to watch it. Such an approach can have the beneficial effect of highlighting to lower tier subscribers interesting and popular content that is available as part of a higher tier subscription. This benefits the operator by promoting additional tiers of service, and benefits the user by helping them to identify and evaluate additional purchase options. Other embodiments may use a variety of alternative bases for normalization. For example, an alternative embodiment might normalize viewership of each channel to a baseline measure of its average or peak viewership, causing niche channels or programs that are exhibiting a "breakout" behavior to be highlighted.

The system may attain additional promotional benefits by including featured listings. For example, an interface listing "most popular" programs may include featured listings added regardless of their popularity, in order to promote programs that have not yet attained status among the most popular programs. Preferably, the system explicitly identifies these featured listings as distinct from the most popular programs, for example by displaying them in a different color, or by marking them as featured listings. In an alternative embodiment, the featured listings are not distinguished from those generated based on the aggregated consumption data.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings:

FIGS. 4-9 depict a graphical user interface (GUI) for a system that displays the most popular media based upon collected media usage data, according to an embodiment of the invention.

The present embodiments will now be described with reference to the accompanying drawings. In the drawings, like reference numbers may indicate identical or functionally similar elements.

DETAILED DESCRIPTION

Introduction

Figure 1:
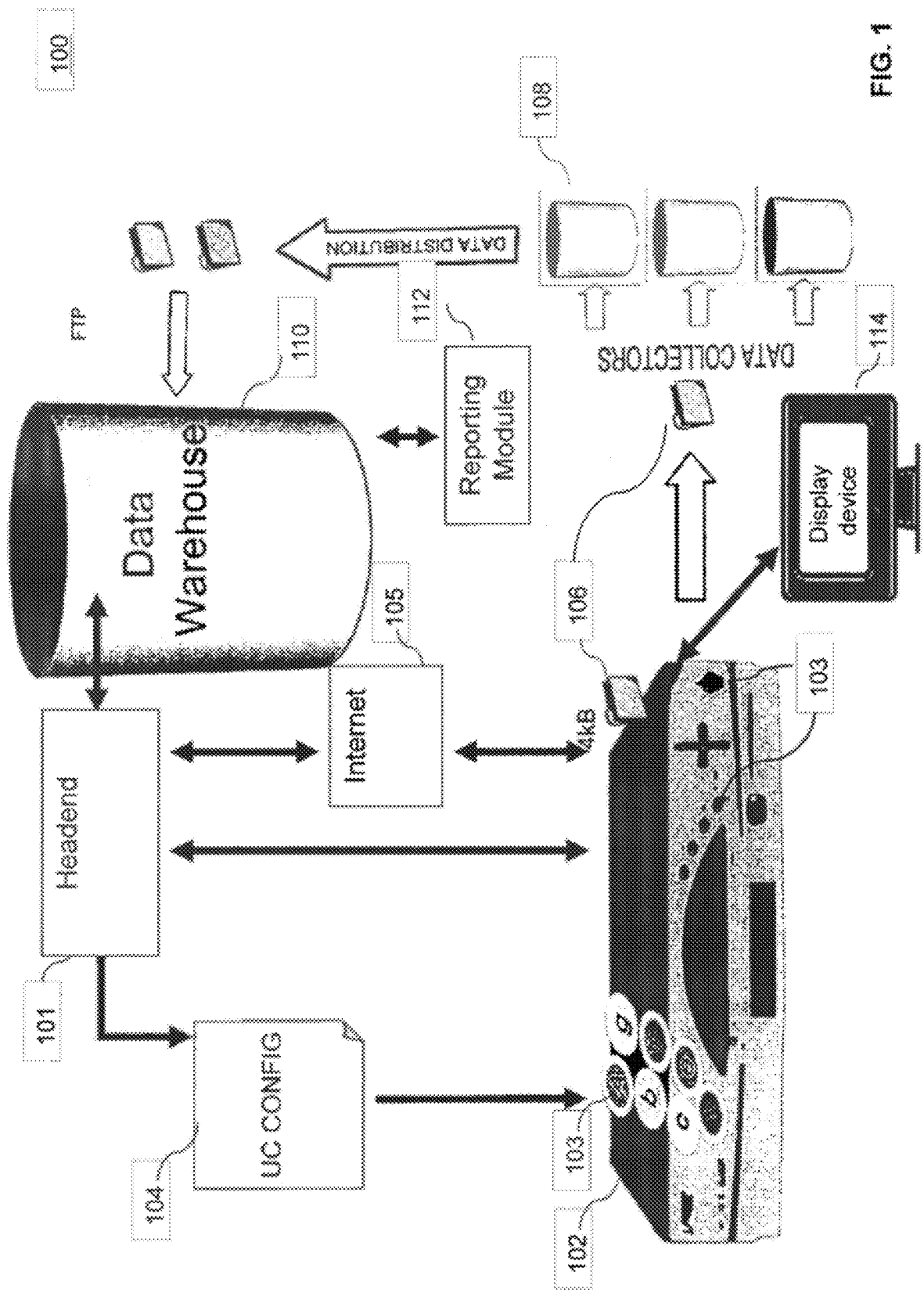
FIG. 1 is a block diagram of an architecture of a video and Internet system for collecting and displaying media usage data, according to an embodiment of the invention.

The following detailed description of the present invention refers to the accompanying drawings that illustrate exemplary embodiments consistent with this invention. While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility. Therefore, the detailed description is not meant to limit the invention. Rather, the scope of the invention is defined by the appended claims.

Glossary

The following definitions are offered for purposes of illustration, not limitation, in order to assist with understanding the discussion of various embodiments that follows.

As used herein, in an embodiment, the terms "broadcast" and "currently airing" means linearly-transmitted/delivered media, regardless of the means of distribution. Broadcasts and currently airing programs are media items that are still available for consumption (i.e., viewing). For example, a broadcast can be a currently airing television program. A broadcast can also be a currently airing pay per view asset, including, but not limited to live performances, concerts, and sporting events.

As used herein, in an embodiment, the term set top box (STB) refers to a device deployed at a viewer's household or business (such as a subscriber or customer premise) to provide the viewer with the ability to control delivery of video programming from a provider. The viewer can issue control commands to the STB, for example, powering on the STB, tuning to a specific channel, and tuning to other specific channels over time. A customer can also send and receive data to and from the provider, for example, via an Internet connection. A viewer may simultaneously, but separately, interact with the Internet and video programming. For example, a viewer can access the Internet in response to video programming, either separately through a computing device with Internet connectivity, or through a browser-enabled STB.

Embodiments of the present invention also can be applied to various navigation devices and platforms used to select and view media and video programming. Such navigation devices can be components of platforms including personal computers, mobile telephones, personal digital assistants (PDAs), tablets (e.g., Apple IPAD™), portable media devices (e.g., IPOD TOUCH™), laptops, Internet Protocol (IP)-based telephones using voice over IP (VOIP), digital video recorders (DVRs), remote-storage DVRs, video on-demand (VOD) systems, interactive TV systems, and other systems capable of receiving and displaying video and/or utilizing a network connection such as the Internet. In addition to an STB, a navigation device can be used to navigate to media, such as, but not limited to, video programs. Such navigation devices can also be used to tune into programs so that they may be viewed on a display device. A non-limiting example of a navigation device is the Apple TV device. References to an STB should therefore be interpreted to include these and other similar navigation devices and systems involving display of video and viewer input.

Unless specifically stated differently, in an embodiment, a user is interchangeably used herein to identify a human user, a subscriber, a customer, a viewer, a household, a software agent executing on behalf of a user, or a group of users and/or software agents. Users may be members of user populations (i.e., groups or sets), wherein the sets are related to a specific provider, type or tier of service subscribed to, a geographic area (i.e., users in a certain country, region, postal code, and/or state/province) or demographic grouping (i.e., users of a certain age range, income range, or gender. Besides a human user who is a member of a set, an STB, software application, or agent may be a member of a set. Accordingly, unless specifically stated, the term "user" as used herein does not necessarily pertain to a human being. A user may be represented by a user ID or account number. A user may also be represented by unique ID of a STB associated with the user. Users can have login credentials associated with them. Login credentials can include, but are not limited to, a user name, a password, and a personal identification number (PIN).

As used herein, in an embodiment, the term "most popular" refers to the most viewed channels and programs from available channels and programs in a program guide presented within a user's channel lineup schedule for a current timeslot. For example, the most popular programs may be the top 20 most viewed, based upon tuning information, programs from a program guide within the user's geo-coded channel lineup schedule for the current timeslot. Lists of most popular channels and programs is determined by an aggregation of community viewing habits (i.e., channel tuning) in real time or "near real time" as is technically possible. In an embodiment of the present invention, a system queries a user community STB base and aggregates the community "tuning" habits data to develop a snapshot of the top 20 most popular programs in real time or "near" real time.

As used herein, in an embodiment, the terms "real time viewing data", "real time media usage data", "near-real time media usage data" and "near-real time viewing data" refer to providing aggregated tuning data for programs, media, and channels while the programs and media are still available for consumption. If the media is video programming, consumption can consist of viewing the programming. For interactive media, consumption may include user interactions with the media. Real time media usage data can be provided as quickly as a matter of seconds after one or more STBs or navigation devices are used to tune into programs, or within several minutes, depending on the remaining duration of a given show. Real time and near-real time media usage data may be used to update snapshots and lists of most popular programs as additional STBs are tuned into currently available programs.

As used herein, in embodiments, the terms "viewership" and "viewer" broadly refers to individual viewers, individual users of an STB, a device used to view a program, an STB, and/or households. Thus, viewership information or data can include data related to groups of users, STBs, households, or viewing devices.

As used herein, in an embodiment, the term POD refers to a menu or user interface (UI) element within a graphical user interface (GUI). In an embodiment, a POD is used to receive user selections of programs and channels. In another embodiment of the invention, PODs display real time media and programming consumption feedback, such as, but not limited to, current lists of most-watched channels and programs. According to an embodiment, a UI comprises a plurality of PODs that are targeted based on one or more factors such as, but not limited to, a subscription level (i.e., service tier), hardware footprint (i.e., a subscriber's STB and other subscriber premise hardware), or a business scenario determined to be the best fit for targeted sets of subscribers. According to an embodiment, PODs are designed to display content that is normally hidden within hierarchal constructs to the forefront of a UI, thereby allowing a user to "snack on" or sample a specific service before diving into the full breadth of the associated service content.

System Embodiments

Embodiments of the present invention are described primarily in the context of systems for gathering and indicating real time or near-real time media usage data for real time video programs and channels. It should, however, be understood that the invention is not limited to video programs and channels. The present invention may be used for any media, such as, but not limited to, audio, streaming video, and multimedia data, as would be recognized by persons of skill in the art. Accordingly, the invention is not limited to video systems and may be used for audio networks such as, but not limited to, terrestrial and satellite radio, and data networks such as the Internet. For example, embodiments of the invention can be used to gather and display real time or near-real time usage data for real time audio programs and Internet-based programs and channels.

Systems described herein gather real time or near-real time usage data for real time media, and then publish a portion of that information, reflecting the most popular media at the present time. The collected usage information is published to users via an interactive interface while the media is still available. Systems described herein for collecting and publishing media usage data provide a flexible, configurable, scalable method for capturing media usage events, and transmitting the media usage data in a controlled manner to a database repository such as a data warehouse, head-end based repository, or the like, and subsequently providing an indication of the most popular (i.e., most used or most viewed) channels and programs. The system can target specific users/viewers/ households to obtain viewing and media consumption data including Internet and STB usage, and can anonymize and encrypt the viewing and media consumption data.

In an embodiment, the system can collect media usage data from and publish media usage data to sample sets of users. The sample configuration can be chosen randomly or according to pre-selected criteria. For example, the media usage data can be collected based in part upon sales, demographic and sociographic characteristics of users, while maintaining the anonymity of the households viewing video channels and programs. Accordingly, the system provides very granular data regarding media consumption, including television programs, channels, and Internet usage, while maintaining anonymity. The media consumption data is published to users for their use to select "most popular" content on a near real time basis.

Example systems and methods for collecting and analyzing media usage data are described in U.S. patent application Ser. No. 12/849,630, filed on Aug. 3, 2010 entitled "System and Method for Set Top Viewing Data", which is incorporated herein by reference in its entirety. The methods for collecting and analyzing media usage data disclosed within the '630 application can be integrated into the collection mechanisms of the present invention and integrated across data received for many set top boxes.

Figure 2:
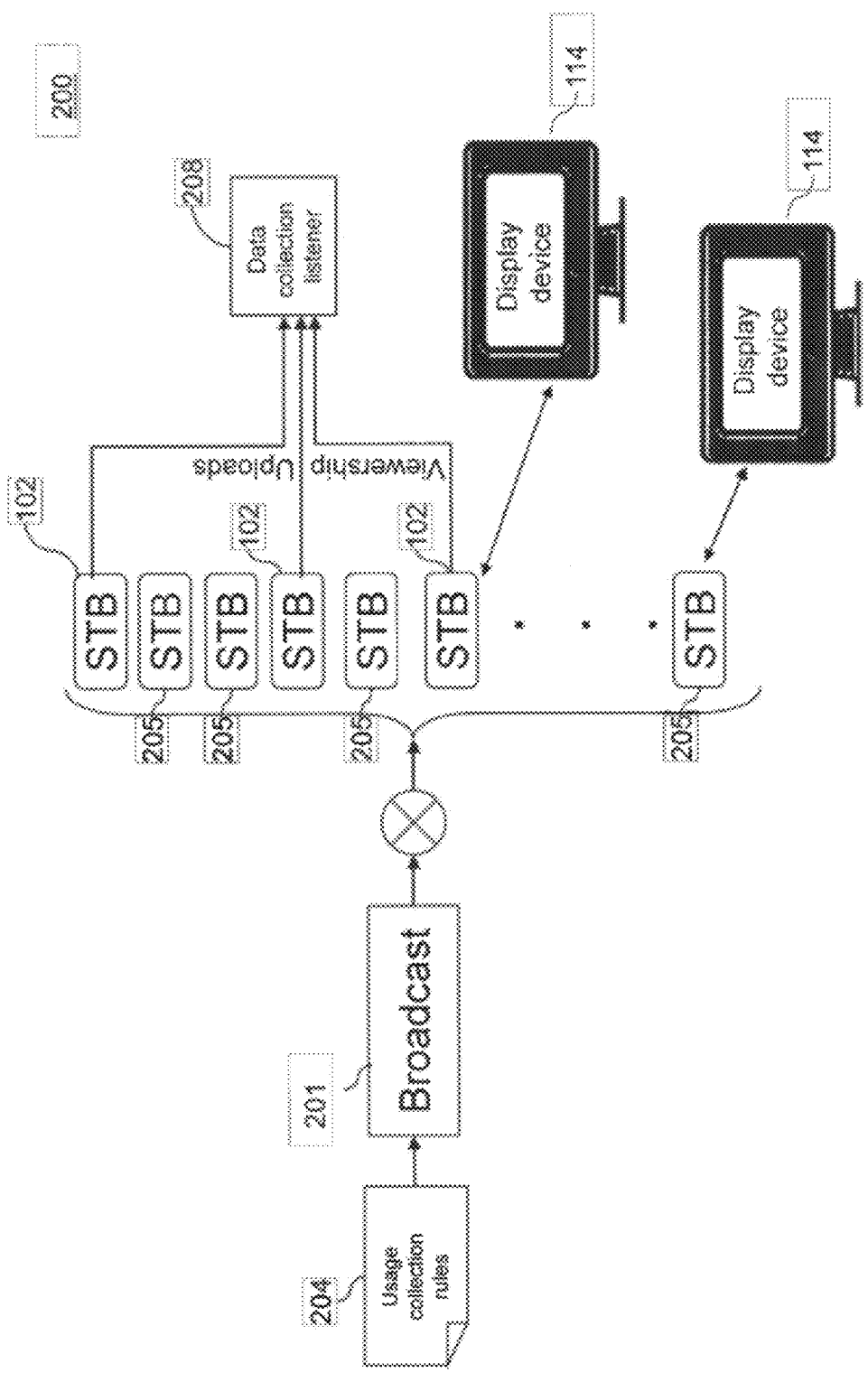
FIG. 2 is a block diagram of an architecture of a system for uploading and displaying media usage data, according to an embodiment of the invention.
Figure 3:
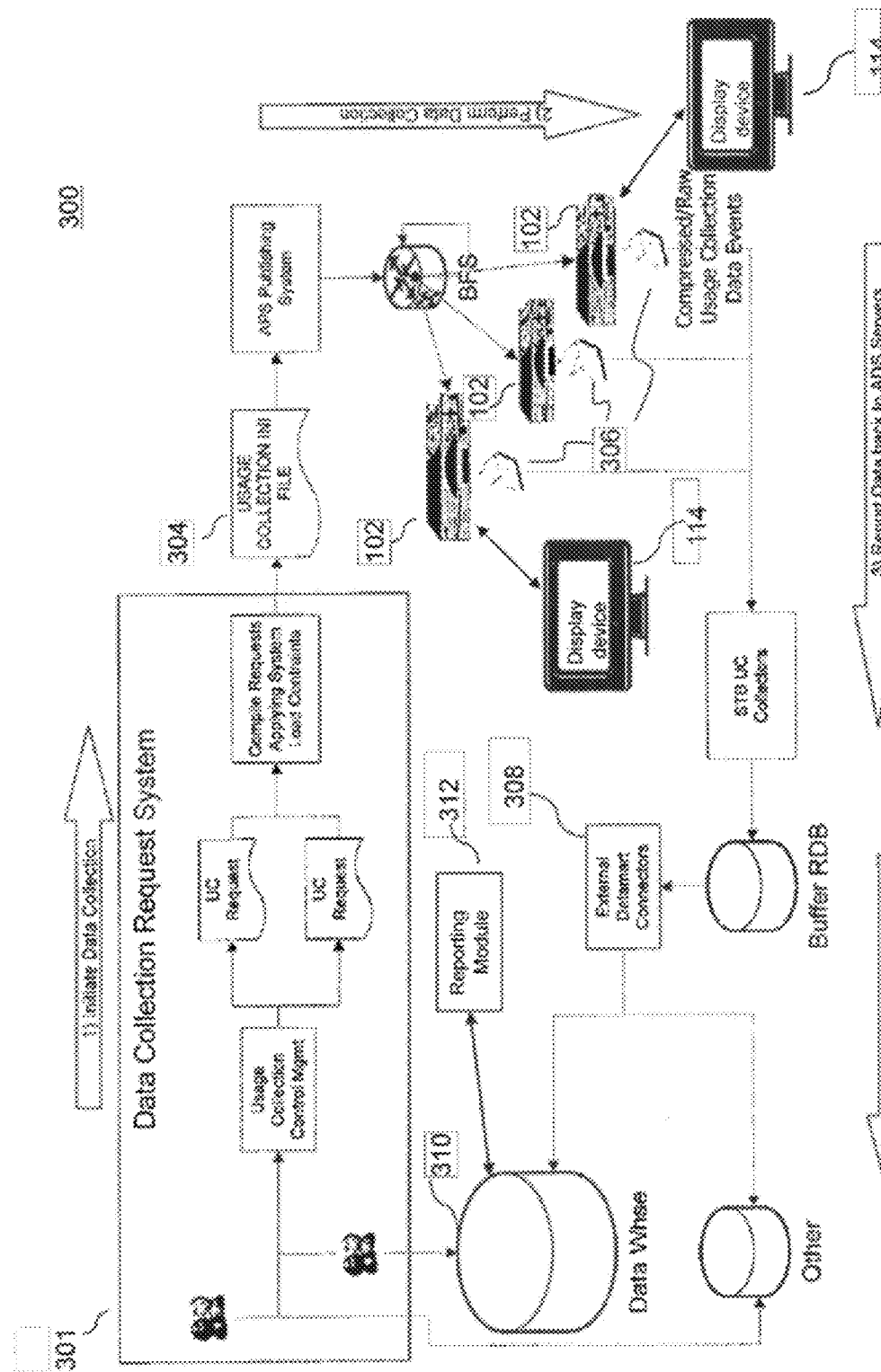
FIG. 3 is a block diagram of an architecture of a system including collection and displaying of media usage data according to another embodiment.

The exemplary system embodiments illustrated in FIGS. 1-3 are depicted with respect to a STB and/or television in connection with data within a service-provider managed network. Embodiments also can be applied to various platforms including personal computers, laptop computers, mobile telephones, personal digital assistants (PDAs), tablets (e.g., Apple IPAD™) and other mobile devices, Internet Protocol (IP)-based telephones using voice over IP (VOIP), digital video recorders (DVRs), remote-storage DVRs, video on-demand (VOD) systems, interactive TV systems, and other systems capable of receiving and displaying video and/or utilizing a network connection such as the Internet. References to a STB and a display device should therefore be interpreted to include these and other similar systems involving display of video, media consumption, and viewer input.

FIG. 1 provides a block diagram of an architecture of a system 100 for collecting and publishing real time or near-real time data indicating channels and programs that are currently receiving the most viewership. System 100 collects media usage data needed to present a snapshot of the "most popular" channels and programs at the present time of day based on an aggregation of community tuning at any given point in time. System 100 then collects viewing/tuning data needed to auto update the display of "most popular" channels and programs continuously thereafter during the course of a viewing session.

According to an embodiment, system 100 displays a UI (shown in FIGS. 4-9) on display device 114. In embodiments, display device 114 may be one or more of a television, a network-enabled television, a monitor, the display of a tablet device, the display of a laptop, the display of a mobile phone, or the display of a personal computer. The UI includes a guide (See Guide 422 in FIGS. 4-8) comprising a most popular POD menu, which displays an itemization indicator presented in the format of "x of y" (e.g., 1 of 20). The priority display and itemization are equal in that itemization shall act to indicate to the user the "most popular" program being an increment of "1", in ascending order, with least popular being an increment of "20".

In accordance with an embodiment, system 100 collects media usage data from within a service-provider managed network. For example, system 100 can be a video system configured to collect real time or near-real time media usage data within a video content provider's network. System 100 includes STB 102. Exemplary STB 102 can include, without limitation, an Internet Protocol (IP)-based (i.e., IPTV) STB. Embodiments are not limited to this exemplary STB, and it would be apparent to those skilled in the relevant art(s) that other STBs can be used in embodiments described herein, including personal computers. STB 102 is coupled to display device 114. Although only one STB 102 and display device 114 is depicted in FIG. 1, as would be understood by one skilled in the relevant art(s) and as shown in FIGS. 2 and 3, a plurality of additional STBs and display devices 114 can be used with system 100. A network-connected device separate from STB 102, such as a personal computer, can be connected to the Internet 105, although not specifically illustrated. Accordingly, the headend 101 can receive and monitor media usage data associated with viewer interaction with the Internet 105 or video programming. STB 102 can also interact with media usage data.

STB 102 is configured to interact with media including receiving video broadcasts and data from Internet 105 from headend 101. STB 102 receives operational commands from a viewer, including tuning actions. A remote control input device (not shown) may be used to control operation of STB 102. In an alternative embodiment, some set-top boxes 102 may have controls 103 thereon not requiring the use of a remote control input device. The remote control input device is configured with buttons to control STB 102, including play, pause, stop, etc.

STB 102 can be configured to receive usage collection configuration information (UC Config 104). As illustrated, UC Config 104 is sent from the headend 101, although UC Config 104 can be sent from alternate sources, e.g., via the Internet 105, and UC Config 104 can be stored on and updated at STB 102. STB 102 can also be programmed to implement tools used for capturing viewing activity. STB 102 can receive updates to re-program STB 102 and associated tools.

UC Config 104 can instruct STB 102 to selectively collect, store, and send media usage data 106. UC Config 104 can instruct an agent (not shown) to poll STB 102 periodically. Programming information associated with video broadcasts received from headend 101 can be included in media usage data 106. Programming information can include, for example, a name of a broadcast program or promotional spot/advertisement, along with other identifying information. Media usage data 106 can also include operational commands from the viewer. Once collected, media usage data 106 can be posted back to the agent. Media usage data 106 can be associated with a household, and can include an anonymous tracking number corresponding to the household, specific equipment used, the date and time in seconds, the channel and program tuned, and the duration in seconds of the viewing of that channel before the channel was changed or STB 102 was powered off.

Media usage data 106 can be collected without specific programming information such as the name of programming and meta data such as actors featured in the programming. Excluding such meta data can reduce the total amount of media usage data stored, transmitted, etc. The specific programming information can be recovered by combining media usage data 106 with, for example, program content logs. The specific programming information is accurately correlated with the media usage data 106 based on, for example, timestamps included in the media usage data 106 and the logs. In this way, channel information from media usage data 106 can be subsequently correlated with programs. In an embodiment, system 100 can use electronic program guide data to correlate channel information from media usage data 106 to programs currently airing and then publish a list of the most popular programs, rather than a list of the most popular channels.

In addition, for example, media usage data 106 can include interaction with Internet 105. Headend 101 controls access to Internet 105, and can therefore monitor viewer interaction over Internet 105 for storage with media usage data 106. Alternatively, STB 102 can store media usage data 106 associated with viewer interaction with the Internet 105. It is also contemplated that specific Internet connected devices, separate from STB 102, can report media usage data 106 to the headend 101, STB 102, data collectors 108, etc. along with timestamp information that can be used to correlate the Internet activity.

In one embodiment, information about household members can be collected and stored, for example at the head end or other repository. Information can include, without limitation, name, address (including zip code), and age. Other demographic and/or geographic information can also be collected. Alternatively, a third party can provide data. Also, information such as brand/type/model of television, phone, computer, PDA, mobile device, etc. could also be collected. This information can then be associated with media usage data. However, the data can be made anonymous (e.g., removing specifically identifying information).

STB 102 can be instructed to collect media usage data 106 continuously over time. STB 102 can also be instructed to collect media usage data at intervals, or at specific times associated with a change in any parameter including changes in media usage data, programming, promotional spots, advertisements, and overlays.

For example, video programming from headend 101 can include interactive overlays. Overlays can include promotional information such as a link to a website. Because system 100 includes monitoring of Internet 105, it is possible to collect data including a viewer's interaction with Internet 105. Internet interaction data can be stored along with media usage data 106, and can also be maintained separately along with timestamps for correlating the data over time.

Each of head-end 101, STB 102, and viewing device 114 may be implemented on any type of computing device. Such computing device may include, but is not limited to, a personal computer, mobile device such as a mobile phone, a workstation, an embedded system, a game console, a television, or any other computing device. Further, a computing device may include, but is nut limited to, a device having a processor and memory for executing and storing instructions. Software may include one or more applications and an operating system. Hardware may include, but is not limited to, a processor, memory and graphical user interface display. The computing device may also have multiple processors and multiple shared or separate memory components. For example, the computing device (e.g., head-end 101) may be a clustered computing environment or server farm.

STB 102 can be instructed to collect media usage data 106 associated with events. For example, STB 102 can collect a sampling of media usage data 106 continuously or periodically, e.g., every minute. As used herein, in an embodiment, the term continuous is used to mean substantially uninterrupted. As used herein, in accordance with an embodiment, the term periodically means more often than on the half-an-hour. Continuously and periodically collecting samplings of media usage data 106 allows a more granular indication of the programs and channels recently tuned (i.e., viewed) by a sample audience. Additionally, STB 102 can collect media usage data 106 when STB 102 receives an operational command from the viewer, or when Internet activity is detected. STB 102 can also collect media usage data 106 associated with a change in video broadcast programming. For example, STB 102 can collect first media usage data 106 upon receiving an operational command to tune to a specific broadcast channel, second media usage data 106 associated with a first commercial break on the tuned channel, third media usage data 106 associated with tuning to a different channel, fourth media usage data 106 associated with tuning back to the original channel, and fifth media usage data 106 associated with Internet activity. Events can be associated with a high priority, to ensure that collecting media usage data 106 is triggered by the occurrence of a high priority event. Each data collection includes a timestamp, which can be used to correlate the data collection and also identify an amount of time spent on an activity relative to the prior or next data collection (including turning off STB 102).

STB 102 can be configured to include a dwelling time associated with a duration of an activity, e.g., a duration that STB 102 has been tuned to a channel or program. The dwelling time can be used as a factor in determining a granularity associated with whether to collect media usage data. For example, STB 102 can be configured to include a dwelling time of 10 seconds, such that media usage data 106 is recorded only for events equal to or greater than 10 seconds in duration. Accordingly, STB 102 can exclude from the "most popular" listings media usage data 106 collected during "channel surfing" sessions wherein a viewer rapidly tunes through a series of channels, spending less than the dwelling time (e.g., 10 seconds) viewing each channel. In this way, STB 102 can conserve resources by storing media usage data 106 that is more likely to reflect attentive viewing and not merely channel surfing. However, STB 102 can record all events continuously, regardless of whether "channel surfing" data is included.

Media usage data 106 can also include information regarding the type of equipment used by the viewer. For example, media usage data 106 can identify the specific navigation device, platform, or STB equipment, such as a brand and model of STB 102, including whether STB 102 is digital or IP-based. Although not specifically illustrated, system 100 can include a personal computer or the like, configured to interact with the Internet 105, receive video broadcast from headend 101, or interact with a viewer for video control and display. Such devices can include cellular telephones, tablet computers, or other devices configured to interact with a network or the Internet 105. Accordingly, the personal computer can collect, store, send, and otherwise interact with media usage data 106 and Internet 105 as would STB 102. Headend 101 controls the data connection for Internet 105, and therefore can monitor the Internet activity for a household or individual viewer.

Such viewing and Internet activity can include activity initiated on a viewer's cellular telephone. For example, a cellular telephone can interact with the Internet using a wireless Internet Protocol (IP)-based connection, e.g., IEEE 802.11 wireless local area network (WLAN) computer communication ("WIFI"). In addition, a household can include a wireless cellular network extender that utilizes the Internet 105 and allows cellular telephones to connect via their native wireless cellular connection. Embodiments can also include Internet Protocol (IP)-based telephones using voice over IP (VOIP). Accordingly, system 100 can monitor many types of Internet activity at the household.

The system 100 can include very specific, individualized monitoring and data collection. For example, viewers can be associated with a unique identification (ID) or login. Examples of unique IDs include biometrics such as fingerprint, retina scan, or the like, text-based logins/passwords, radio-frequency identification (RFID), cellular telephone-based identification, or the like. STB 102 can include readers for monitoring and accepting such individual, unique IDs from each viewer. System 100 can also implement customizable icons or avatars associated with each unique ID, as well as the entire family or household, to encourage viewers to login and utilize the unique IDs.

FIG. 2 illustrates a block diagram of an architecture of a system 200 including randomized upload of media usage data from within a service-provider managed network according to an embodiment. System 200 includes headend 201 configured to broadcast to STBs 102 and 205 associated with households. For example, system 200 can involve a sample of more than 50,000 STBs 102 and 205 from which media usage data can be collected. STBs 102 and 205 are in turn connected to respective display devices 114 in the associated households.

By using system 200, popularity of programs and rental assets can be determined by collecting media usage data 106 from all STBs 102 and 205, or from a sample of STBs 102 and 205. Example methods and systems for collecting media usage data are described in U.S. patent application Ser. No. 12/849,630, filed on Aug. 3, 2010 entitled "System and Method for Set Top Viewing Data".

FIG. 3 illustrates a block diagram of an architecture of a system 300 including collection and reporting of real time or near-real time media usage data 306 from multiple STBs 102 within a service-provider managed network according to another embodiment. System 300 includes data collection request system 301 that distributes a usage collection file 304 to multiple STBs 102. In an embodiment, usage collection file 304 includes data collection rules and parameters indicating how often to collect media usage information from an STB 102.

Based on the usage collection file 304, STBs 102 selectively collect and/or store usage collection data events and Internet usage events (real time media usage data 306). Real time media usage data 306 is collected by data collectors 308, and exported to data warehouse 310. Reporting module 312 can be in communication with data warehouse 310 to provide various reports based on real time media usage data 306 stored in data warehouse 310. Although one reporting module 312 is shown, multiple reporting modules can be provided in communication with various components and data of system 300. For example, one or more reporting modules 312 may be used to publish reports of "most popular" channels with currently-available programs. Reporting modules 312 may also be used to publish "top picks" reports of currently-available pay per view assets to STBs 102 for display on display devices 114.

In accordance with the embodiments described above, an example system can collect second-by-second media usage data from many selected sets of households, identify the most popular channels, and subsequently present the most popular channel information in an interactive user interface. Real time media usage data 306 includes channel-tuning events, capturing the date, time, channel and duration of the tuning event. This media usage data enables the statistical calculation of real-time individual program share (i.e., relative popularity) and viewership to determine popularity of programs within sample households.

Reporting Media Usage Data

Collected media usage data from a selection of households can be aggregated in reports and published to users as reports or lists of "most popular" programs and channels. The media usage data for currently-available pay per view assets can also be published to users as a list of "top picks" of pay per view assets (i.e., titles, names of sporting events). Reports can be provided by reporting modules 112 and 312 as shown in FIGS. 1 and 3, respectively. Multiple reporting modules can be provided, using the metrics and other data/attributes available throughout the exemplary systems of FIGS. 1-3.

Reports can be generated based on categories such as channel, household count, STB count, total household percentage, and total STB percentage. The media usage data provides additional options for creating reports, including a collection task sample (e.g., a sample of one percent of total), video tier, region (e.g., specific metro areas, broadcast coverage areas), network, parent network, demographic attributes, zip code, and number of programs to include in a list (e.g., the top 20).

In embodiments, reporting modules 112 and 312 aggregate like channels before ranking their relative popularity. For example, the reporting modules may combine the standard definition (SD) and high definition (HD) versions of a channel, for the purpose of ranking popularity of programs. In an embodiment, the reporting modules may then publish only a single entry for the associated program in a UI displayed on display device 114, and the UI may use information about the set-top box, or the user, to tune the most appropriate version of the program, when a "most popular" program is selected by the user in the UI. For example, the systems depicted in FIGS. 1-3 may automatically tune the associated SD channel if an STB 102 is not capable of tuning high definition channels, while tuning the associated HD channel on a set-top box that is capable of tuning such channels.

A first example report, audience by channel (ranked by household count), can provide a list of channels in rank order of number of households viewing in a current or most recent period.

In another embodiment, reports are generated to indicate popularity aggregated across all users or set-top boxes participating in a video system, such as system 300 depicted in FIG. 3. In another embodiment, reports may segregate the users into multiple separate groups, such as by geographic region or by demographic clustering, and separately aggregate and publish popularity of content to users based solely on usage within their defined group.

According to another embodiment, reports are generated to indicate popularity of content aggregated across all tiers of services, including for example, basic, extended basic or family, and premium tiers of service. However, this approach may tend to bias popularity rankings for the most commonly available content, such as the over-the-air broadcast stations carried on the basic tier.

Accordingly, in another embodiment, reports can be generated to indicate popularity segregated by tier, so that, for example, premium tier subscribers see the popularity of programs among subscribers to the same or a similar tier, providing a potentially "fairer" reflection of the popularity of premium content that is less widely available among the general population of users.

Reports correlating at least one media program not identical to a previously aired media program measured in the media usage data can also be generated. For example, in an embodiment, a report correlating the media usage data to currently airing or future scheduled media can be generated so that a list including at least one media program not identical to a previously aired media program measured in the media usage data is generated. In another embodiment, a report based upon a correlation of media usage data for previously-aired media is automatically correlated to different media, wherein the different media is currently airing or scheduled to be aired in the future. For example, this example report may correlate usage data for last week's episode of a television series to the current Week's episode, which is either currently airing or has not yet aired. In an embodiment, correlation errors are avoided by differentiating 'duplicate' media usage data. For example, a reporting module can be configured to ensure that correlation between programs of the same series, airing on the same channel are not erroneously correlated with syndicated reruns (which may artificially inflate their popularity rankings). Similarly, multiple airings in different, particular timeslots may be distinguished in the correlation process. Alternatively, or in addition, additional guide data detail may be used to facilitate accurate correlation, for example, distinguishing premiering episodes vs. non-syndicated repeats, so that only similar airings of the related previously aired media are correlated to currently airing or future scheduled media.

Another example report, audience by network—combined SD-HD (ranked by household count), can be based on the first example report and can automatically combine the high-definition (HD) and standard-definition (SD) version statistics for networks with HD versions. The third example report can be used, regardless of the split of viewership between HD and SD formats, to assess and compare/contrast networks as in the first example report. In this example report, HD and SD viewership for each network can be represented by a single combined entry indicating overall "popularity" of a given program offered in both SD and HD versions.

In still another embodiment, reports of "most popular" channels can weight different channels differently, to adjust for differences in availability of the various channels. For example, the viewership of each channel may be normalized based on the subscribership to that channel, so that the popularity rankings reflect the percentage of viewers with access to the channel who choose to watch it. For example, normalized rankings may be calculated based upon the percentage of the subset of viewers with higher tier subscriptions, including access to premium content, who are currently tuned into this content. Such an approach may have the beneficial effect of highlighting to lower tier subscribers interesting and popular content that is available with a higher tier subscription. This benefits the operator by promoting additional tiers of service, and benefits subscribers and users by helping them to identify and evaluate additional purchase options. In an embodiment, subscribership figures may be estimated or approximated. For example, subscribership to a given tier or channel may be an approximation based on recent subscriber data, in view of projected subscribership trends.

According to another embodiment of the invention, reports ranking "most popular" channels can be filtered based upon media preference data. For example, media usage data 106 may include media preference data indicating media preferences for users consuming currently airing media. Such media preference data can include, but is not limited to, preferences for media related to news, weather, sports, music, genres of programs (i.e., reality, drama, comedy, talk, et al.) and genres of motion pictures (i.e., documentaries, action/adventure, comedy, drama, western, science fiction, romance, horror, foreign, et al.). A report indicating the relative popularity of one or more currently airing content on one or more media channels can be generated and displayed as a ranked list. In an embodiment, this ranked list can then be filtered based upon the media preference data. Such filtering can produce personalized "most popular" reports by computing the similarity between an individual user's media preferences and media items in the ranked list. For example, a "most popular" list can be filtered so that currently airing sporting events are removed for users whose media preferences indicate that they rarely or never watch live sports. In another embodiment, the items in the ranked list can be weighted based upon the media preference data. For example, a "most popular" list can be weighted so that currently airing sporting events are higher ranked or otherwise highlighted in "most popular" lists for users having media preferences for sports-related media. Conversely, currently airing children's programming might be reduced in rank for users who only rarely watch such programs. In an embodiment, this filtering or weighting uses media preference data received with media usage data 106 from STBs 102 associated with particular users, so that reports displayed via those STBs 102 are filtered based upon the users' personal media preference data. As a result of this filtering or weighting, one or more channels or programs may be removed from, added to, or re-ordered within, the ranked list of "most popular" channels or programs, for a specific user or group of users.

According to yet another embodiment of the invention, a ranked list of "most popular" channels or programs may be adjusted to incorporate one or more "featured" listings. For example, a list displayed in a UI on display device 114 may include featured listings added regardless of their popularity, in order to promote programs that have not yet attained status among the most popular programs. Preferably, reports identify these featured listings as distinct from the most popular and "top picks" programs, for example by displaying them in a different color on display device 114, or by marking/labeling them as featured listings. Alternatively, featured listings are not distinguished from those generated based on the aggregated Media usage data 106. Featured listings may be assigned a weighting that, when combined with actual viewership, causes them to be ranked higher, or alternatively, they may be assigned a ranking independent of their viewership. Conversely, listings may be weighted so that, when combined with actual viewership data, selected listings are caused to be ranked lower, or alternatively, selected listings may be eliminated from the rankings, altogether, regardless of viewership. Accordingly, a selected or featured listing may be configured for inclusion, exclusion, prioritization or de-prioritization, in the ranked listing. Featured listings may be incorporated uniformly across all users, or they may be selected on a user-specific basis. For example, featured listings for a specific user may be selected based on a user's particular media preferences, demographics, psychographics, or other user-specific profile information, from a larger set of listings intended for featuring.

Embodiments of the invention enable ranking of programs and channels based on share and viewership calculations. Real time or near-real time displays of ranked "most popular" programs and channels in an interactive UI allow users to select media that is currently available from a provider.

The embodiments described herein can determine details regarding broadcasted programs, series, and channels. The details can include anonymously determining who is watching what at the program level, within and across series and channels.

Embodiments can also enable presentation of "top picks" of media currently available for viewing or streaming including, but not limited to pay per view assets by examining current pay per view viewing of active viewer segments to identify the most viewed media content currently airing. Regarding the current anonymous audience, it is possible to determine what the current anonymous audience is watching, including any rentals the audience is tuned to. It is also possible to identify other viewers having viewing patterns and rental histories similar to the current anonymous audience, including what the other viewers are watching on a real time or near-real time basis.

Embodiments can facilitate the use of data collected and/or analyzed in near real time, for specifically targeting "most popular" and "top picks" lists to the particular audience while using the STB. For example, media usage data from a STB and Internet usage can be collected, and based on the data, lists of the top 20 currently airing programs and rental assets can be served to the STB in near real time. Rental assets may include on demand assets, such as VOD assets. Ranking of such rental assets can be based upon currently active on demand sessions, instead of historical data for past orders or VOD sessions. Accordingly, embodiments enable real time or near-real time feedback of media consumption patterns occurring for media that is presently available, in order to assist users in deciding among media to consume in the present.

Example Graphical User Interface

FIGS. 4-9 depict a graphical user interface (GUI) for displaying collected media consumption information. In an embodiment of the invention, graphical user interface (GUI) described above with reference to FIGS. 1-3 may include the exemplary interface illustrated in FIGS. 4-9. FIGS. 4-9 are described with continued reference to the embodiments illustrated in FIGS. 1-3. However, FIGS. 4-9 are not limited to those embodiments. Throughout FIGS. 4-9, displays are shown with various hyperlinks, command regions, tabs, buttons, checkboxes, and data entry fields, which are used to initiate action, invoke routines, enter data, view data, or invoke other functionality. For brevity, only the differences occurring within the figures, as compared to previous or subsequent ones of the figures, are described below.

FIGS. 4-9 illustrate an exemplary GUI for viewing and acting upon media consumption information, such as the information collected by systems 100, 200, and 300 described above with reference to FIGS. 1-3, in accordance with an embodiment of the invention. In an embodiment, the GUI depicted in FIGS. 4-9 may be displayed on a display device 114, such as a TV or monitor, coupled to STB 102 (See FIG. 1).

Figure 4:
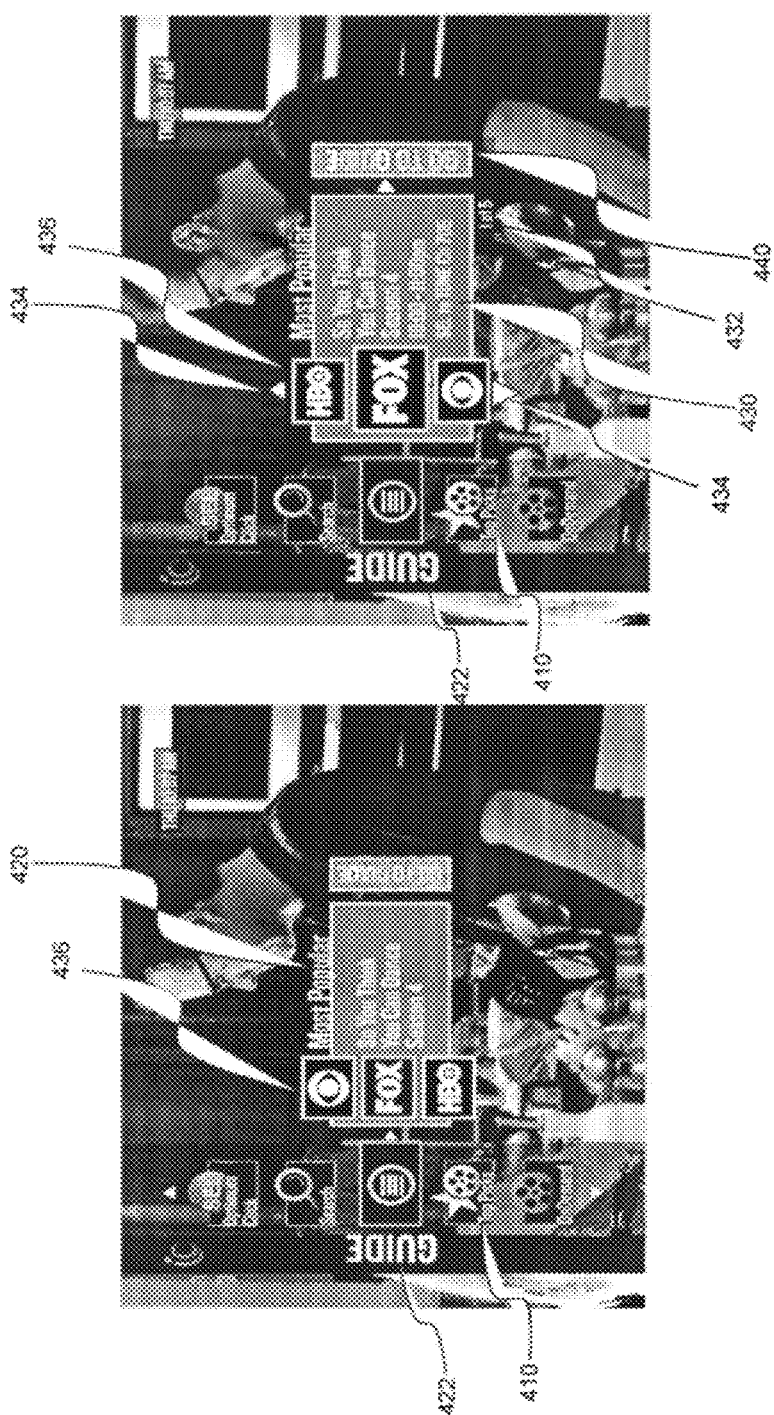

FIG. 4 illustrates a top-level display that a user may access at display device 114 in order to access media via STB 102 (See FIG. 1). In the example embodiments depicted in FIGS. 4-9, media consumption information pertains to video content. In an embodiment, most popular POD menu 420 presents a snapshot of the "most popular" programs at the present time of day based on an aggregation of community tuning at any given point in time.

In the example embodiment depicted in FIG. 4, a user, using an input device such as a remote control or controls 103 on STB 102, may select Guide 422 icon to view a most popular POD menu 420 indicating the most popular channels and programs. In the example embodiment of FIG. 4, most popular POD menu 420 displays an itemization indicator 432 presented in the format of "1 of 5". The priority display and itemization are equal in that itemization acts to indicate to the user the "most popular" program being an increment of "1", in ascending order, with least popular being an increment of "5". The number of itemized or ranked programs and channels is finite, but arbitrary. Possible values range from one to the total number of channels available on the system. In an embodiment, the number of ranked programs or channels may be set by the service provider. In an alternative embodiment, the user is enabled to configure the number of programs or channels to be ranked.

The most popular POD menu 420 displays two focusable tiers of information as follows in Table 1.

TABLE 1

Information Tiers in Most Popular POD Menu

| Tier | Focusable Field Examples |
|---|---|
| 1 | Displays scrollable channel logos 436 associated with currently airing programming. Upon selection with an input device, a user can tune to a channel (broadcast, pay-per-view, or interactive) corresponding to the indicated "most popular" program. |
| 2 | The rightmost button is the "Go To Guide" button, which launches the main program guide. |

Most popular POD menu 420 also includes expanded description 432 indicating title and channel information for the most popular programs. Up and down arrows 434 are visual indicators to a user that up and down arrows on an input device (not shown) will allow the user to scroll through channels. In embodiment, the input device can be, but is not limited to a remote control input device, a keyboard, or touch screen. In the example interface depicted in FIG. 4, by selecting up and down arrows on an input device, a user can scroll through the most popular currently airing programs within tier 1 described in table 1 above. For example, pressing arrow up/down on a remote control device will scroll through the ranked channels/programs, and pressing a select button (e.g., "SEL") on the remote will tune the selected channel/program. An expanded description 430 indicates an input (e.g., "SEL" or select button) that can be used to tune the currently displayed most popular program or channel. Navigating to tier 2 and selecting Go To Guide 440 causes the user to exit the PODs application altogether, and enter the main program guide.

As shown in FIG. 4, the GUI displays scrollable channel logos associated with the most popular currently-airing programming. For example, channel logos can be scrolled using up and down arrows of an input device within most popular POD menu 420.

By selecting Top Picks icon 410, a user can view the top picks POD menu 520 shown in FIG. 5. Top picks POD menu 520 includes a "what's hot" listing 530 depicted in FIG. 5. As shown in FIG. 5, top picks POD menu 520 displays an itemization indicator 532 presented in the format of "1 of 5" to indicate the top pay per view assets. The priority display and itemization are equal in that itemization acts to indicate to the user the "what's hot" rentals being an increment of "1", in ascending order, with least popular being an increment of "5". In the exemplary embodiment of FIG. 5, top picks POD menu 520 also includes "poster art" or "box art" images corresponding to the pay per view rental. Rentals may include on demand assets, such as VOD assets. Ranking of such rentals can be based upon currently active on demand sessions, rather than data for past rentals, orders, or VOD sessions.

Up and down arrows 534 are visual indicators to a user that up and down arrows on an input device (not shown) will allow the user to scroll through a list of per view programs (including Video on Demand assets). By selecting up and down arrows on an input device, a user can scroll through the most-purchased, currently airing pay per view assets. In an embodiment, the assets available for purchase and ranked as "Top Picks" are pay per view assets such as, but not limited to, live broadcasts such as concerts and sporting events. Expanded description 531 indicates an input (e.g., "SEL" or select) that can be used to preview and subsequently order the currently displayed top pick asset in an embodiment, the currently displayed top pick asset can be ordered by navigating to full menu 536. The real time and near-real time collection of media usage data 106 described above with reference to FIGS. 1-3 enables listing of currently-available assets in top picks POD menu 520.

As shown in FIG. 5, the GUI displays scrollable iconic images associated with the top pick rental assets. For example, a user can navigate between the what's hot images by using up and down arrows 534 on a remote control input device to scroll within top picks POD menu 520.

Figure 6:
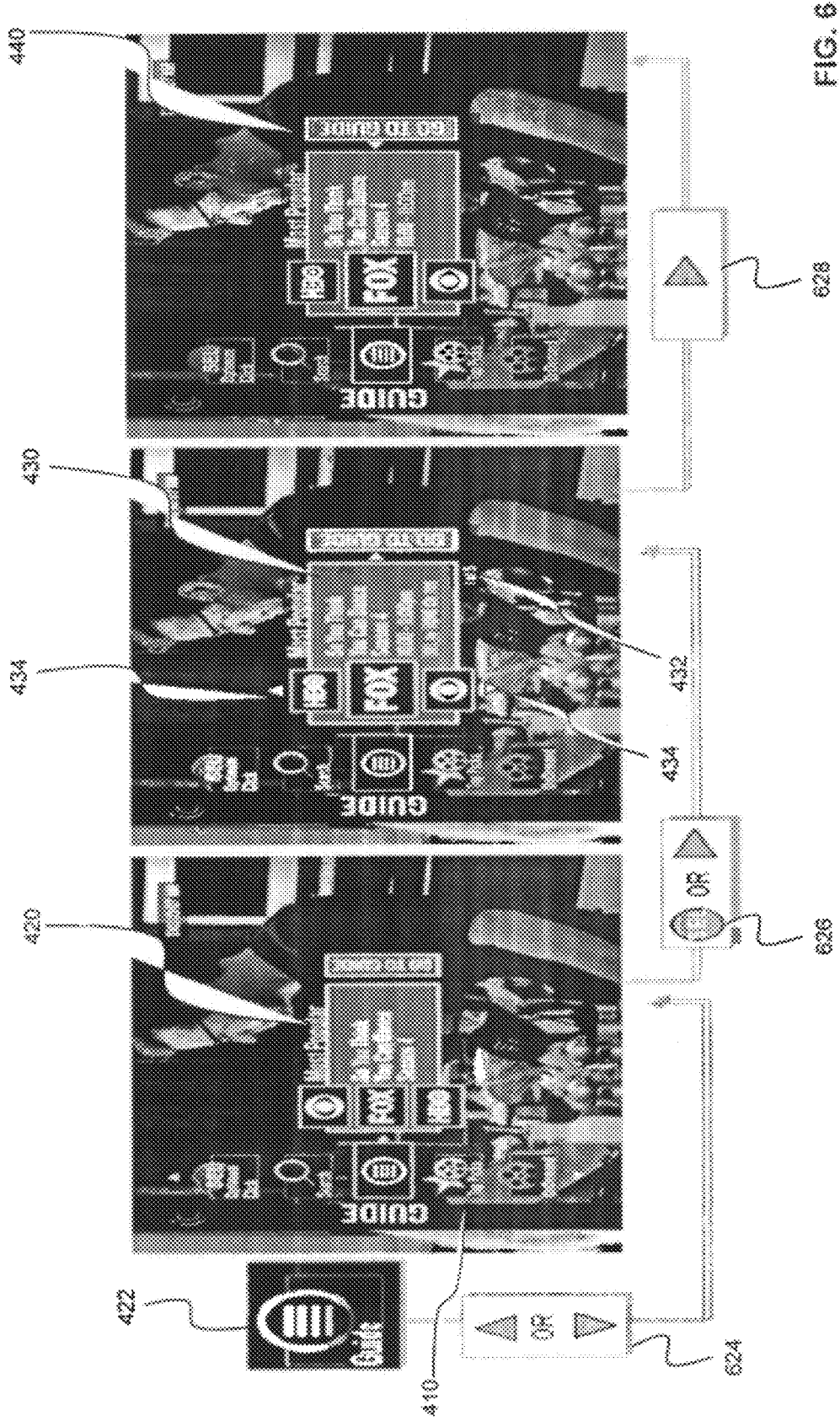

FIG. 6 depicts an exemplary series of displays within the GUI as a user navigates most popular POD menu 420. In the example embodiment depicted in FIG. 6, a user, using an input device, may scroll within the list of PODs and select programs ranked as most popular and their associated channels. By using up and down arrows 624 on an input device such as, but not limited to, a remote control or controls 103 on STB 102, a user can scroll within a list of PODs. For example, a user can scroll until the Guide icon 422 (i.e., Guide POD) is selected. At this point, pressing SEL (select button 626) or right arrow 628 activates/enters that POD (and the POD display visually enlarges to indicate such, including displaying the expanded program description information for the currently selected channel/program). At this point, up and down arrows 624 on the input device may be used to navigate among the list of most popular programs. Pressing SEL 626 will tune the currently selected channel/program and the right arrow 628 will navigate to the "Go To Guide" button 440.

Figure 7:
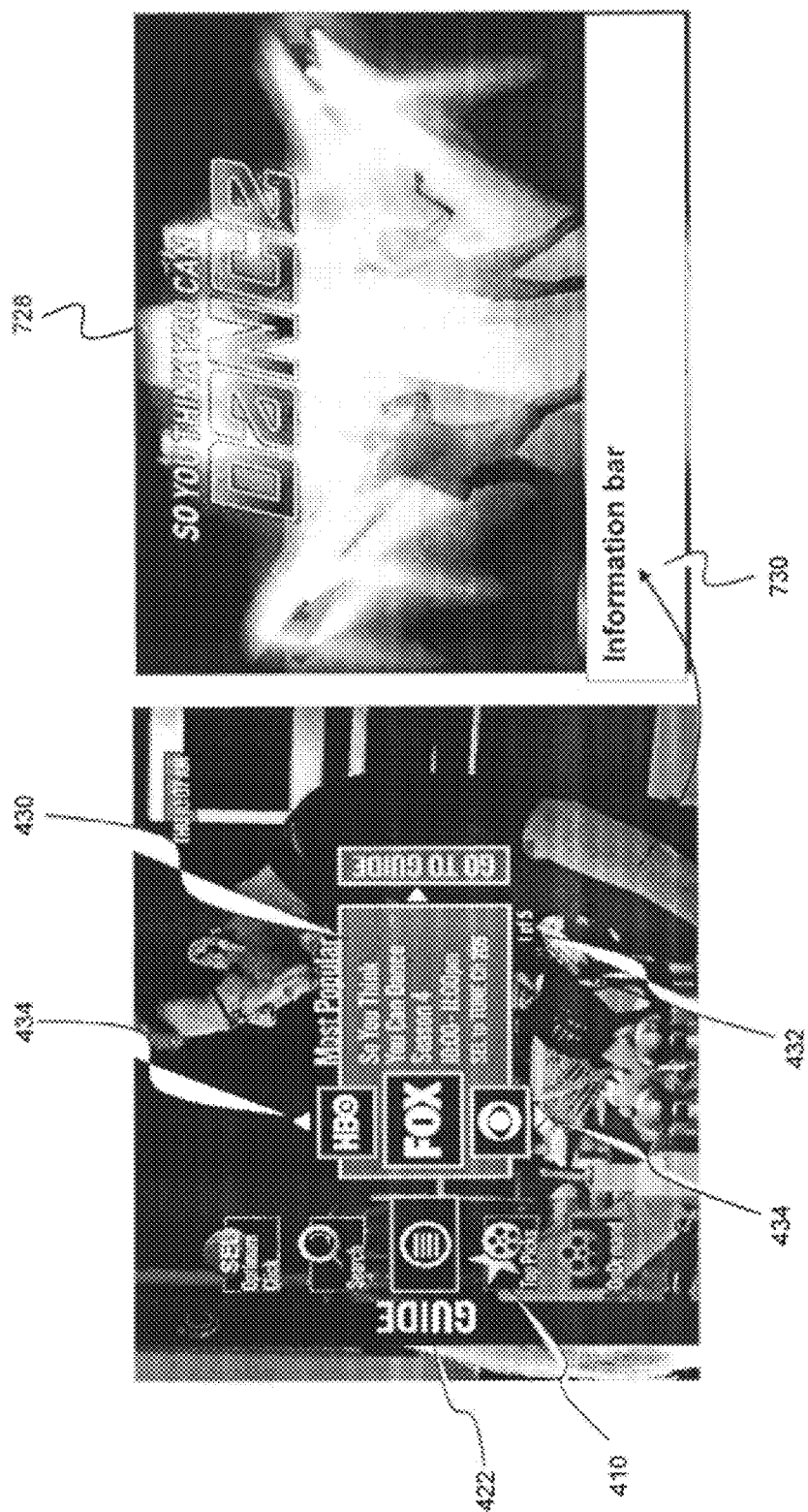

FIG. 7 illustrates an exemplary GUI comprising information bar 730 for a full screen video overlaid by graphics in video window 728. In an embodiment, information bar 730 may display a subset of information from the expanded description 430 overlaid on tuned program shown in underlying video 728. In an embodiment, underlying video 728 displays a channel that was tuned via the Guide when Guide icon 422 was selected.

Figure 8:
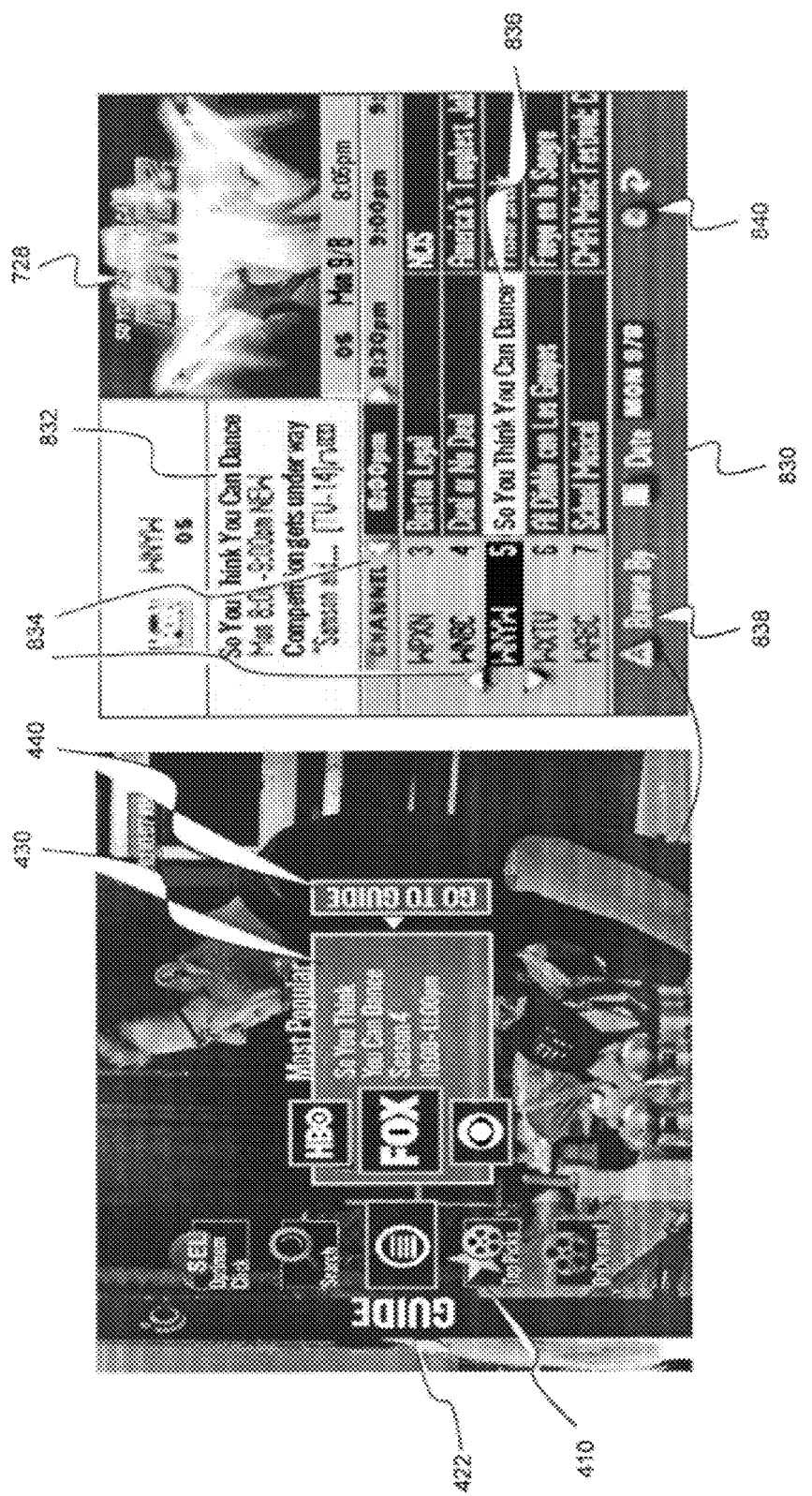

FIG. 8 illustrates an exemplary guide display/selection GUI comprising program description 832, visual indicators of up and down arrows 834, and channel guide 836. In an embodiment, a user may navigate to desired channels and time slots by using up and down arrows 624 on an input device. As the user navigates between channels, the program is shown in scaled video window 728 and a description of the program along with ratings information is displayed in program description 832. In the exemplary embodiment depicted in FIG. 8, navigation bar 830 displays navigation information including the date of programs being browsed in channel guide 836, program browsing control button 838, and a return button 840. Selection of return button 840 returns the guide display/selection to the currently-tuned channel.

Figure 9:
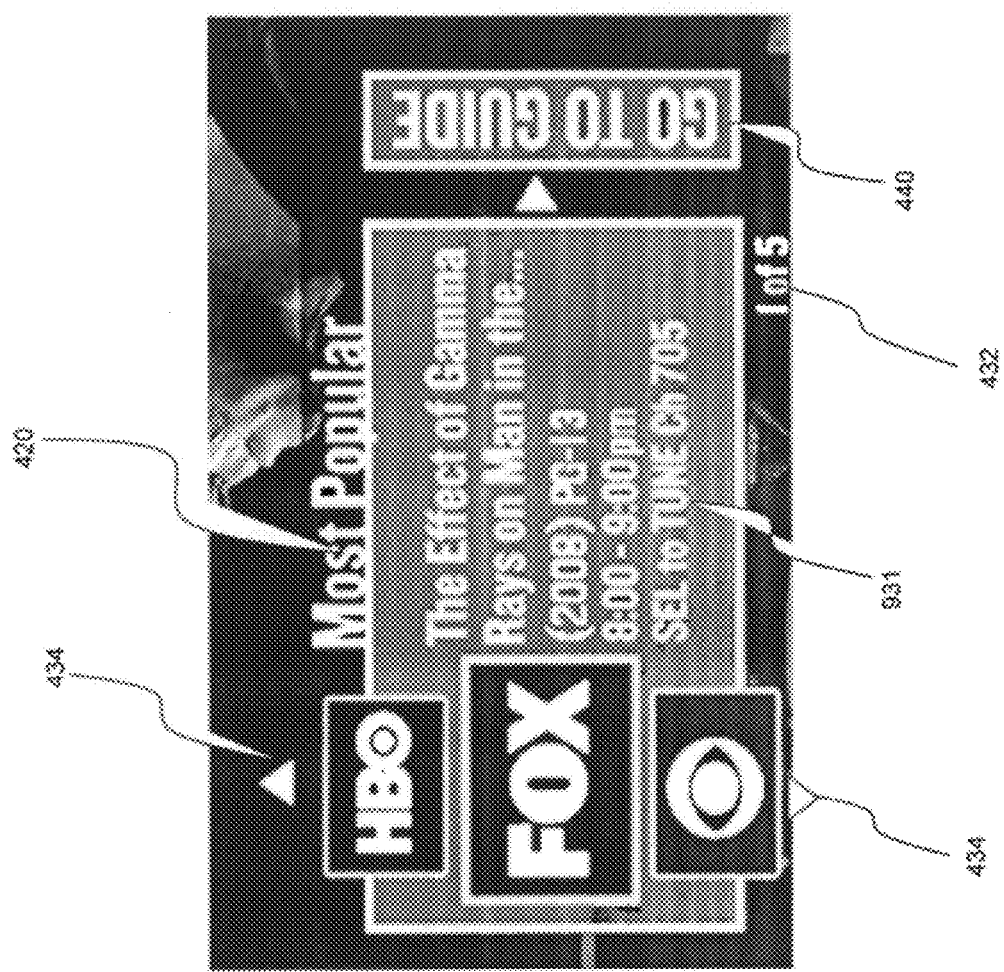

FIG. 9 depicts an expanded movie description 931 for a currently airing movie within most popular POD menu 420. When a user navigates, using up and down arrows 624 of an input device, to a most popular program that is a currently airing movie (as opposed to other types of programming), expanded movie description 931 is displayed. In the exemplary embodiment of FIG. 9, expanded movie description 931 includes rating and release year information. In an embodiment, additional information such as actors and movie duration can be displayed in expanded movie description 931.

Method Embodiments

Figure 10:
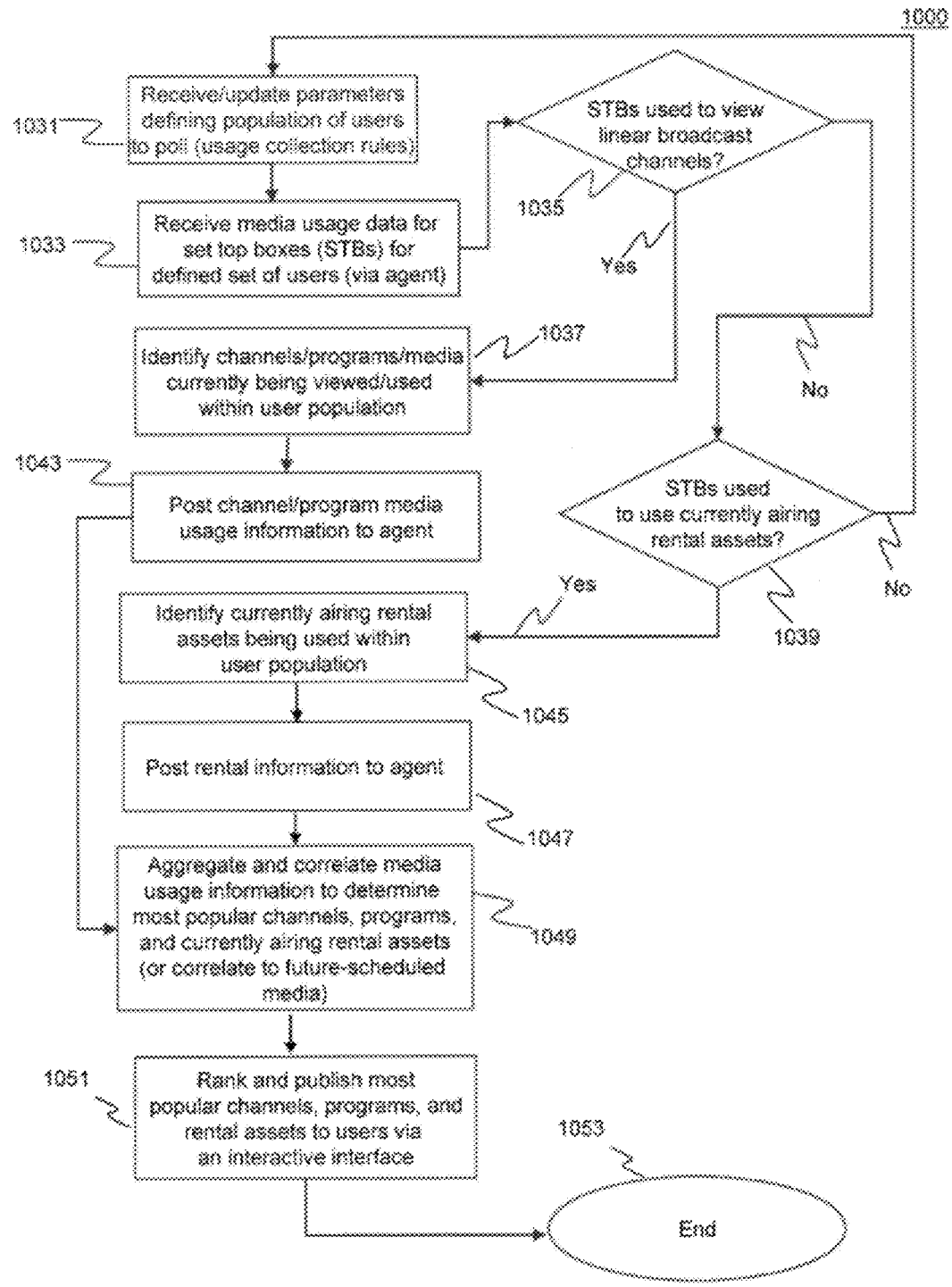
FIG. 10 is a flowchart illustrating steps by which media usage data is collected and published, in accordance with an embodiment of the present invention.

FIG. 10 is a flowchart 1000 illustrating steps by which media usage data is collected and published, in accordance with an embodiment of the present invention.

More particularly, flowchart 1000 illustrates the steps by which a method for collecting and publishing real time or near-real time media consumption information is performed, according to an embodiment of the present invention.

FIG. 10 is described with continued reference to the embodiments illustrated in FIGS. 1-9. However, FIG. 10 is not limited to those embodiments.

The method begins at step 1031 where parameters and rules defining a population of users to poll are received. In an embodiment, step 1031 comprises receiving usage collection configuration information such as UC Config 104, usage collection rules 204, and/or usage collection file 304. The parameters and rules received in this step may include, but are not limited to, a random sample of STBs 102 to poll, geographic locations to poll (i.e., metro areas, zip codes, etc.), and demographic profiles to poll (i.e., households to poll based upon the demographic makeup of users in the households). For example, in step 1031, rules and parameters can be received which define a population of users to poll. The population of users can be based upon a geographic area (i.e., users in a certain country, region, postal code, and/or state/province) or demographic grouping (i.e., users of a certain age range, income range, or gender). After the polling parameters and rules are received, control is passed to step 1033.

In step 1033, media usage data from set top boxes (STBs) corresponding to the parameters and rules received in step 1031 is received. In this step, real time or near-real time media usage data 306 is received from a plurality of STBs 102. In accordance with an embodiment, step 1033 comprises receiving media usage data 306 via an agent that polls STBs associated with a defined set of users, wherein the set of users are defined based upon the rules and parameters received in step 1031. In an embodiment of the invention, step 1033 comprises receiving selectively collected media usage data events from a subset of STBs 102 in a provider network. For example, real time media usage data 306 may be collected by agents resident in data collectors 308. After the media usage data is received, control is passed to step 1035.

In step 1035, an evaluation is made regarding whether any of the polled STBs 102 are tuned to linear broadcast channels. In this step, it is determined if a polled STB 102 is being used to watch a program currently being broadcast on a linear broadcast channel, such as, but not limited to, a television network affiliate. Step 1035 is processed on an STB-by-STB basis for each STB in a group of STBs associated with a defined set of users, if it is determined that one or more polled STBs 102 are tuned to linear broadcast channels, control is passed to step 1037. If it is determined that no polled STBs 102 are tuned to linear broadcast channels, then control is passed to step 1039.

In step 1037, channels and their current programs that STBs 102 are tuned to are identified. In this step, the real time media usage data 306 for linear broadcast channels that are being watched (i.e., tuned to) within the defined user population is determined. After the channels and programs are identified, control is passed to step 1043 where the identified channels and programs are posted to an agent along with associated real time viewing information 306. After real time viewing information 306 for linear broadcast channels is posted to the agent, control is passed to step 1049.

In step 1039, an evaluation is made regarding whether any of the polled STBs 102 are tuned to currently airing rental assets. For example, in this step, it is determined if a polled STB 102 is being used to watch a pay per view asset, such as, but not limited to, a live concert, sporting event, or other currently airing rental asset. If it is determined that one or more polled STBs 102 are tuned to currently airing rental assets, control is passed to step 1045. If it is determined that no polled STBs 102 are tuned to rental assets, then control is passed back to step 1031 and steps 1031-1035 are repeated.

In step 1045, rental assets that STBs 102 are tuned to are identified. In this step, the real time media usage data 306 for rental assets that are being watched (i.e., purchased and tuned to) within the defined user population is determined. After the rental assets identified, control is passed to step 1047 where the identified rental assets are posted to an agent along with associated real time viewing information 306. After real time viewing information 306 for rental assets is posted to the agent, control is passed to step 1049. As noted above, rental assets, include, but are not limited to VOD assets. As will be understood by those skilled in the relevant art(s), linear pay-per-view assets can also be ranked by the method depicted in flowchart 1000.

In step 1049, information identified in steps 1037 and/or 1045 and real time viewing information 306 is aggregated in order to determine the most popular channels, programs, and currently airing rental assets in the defined user population. In an embodiment, this step can aggregate like channels before ranking them. For example, step 1049 may combine SD and HD versions of a channel, for the purpose of ranking popularity of programs. In an embodiment, the method may then subsequently publish (in step 1051) only a single entry for the associated program, and may use information about capabilities of the STBs 102 for the defined set of users, to tune the most appropriate version (i.e., SD or HD) of the program, when selected by corresponding users. In this step, real time media usage data 306 is also correlated to programs currently available for consumption (i.e., currently airing). For example, step 1049 can use electronic program guide data to correlate channels identified in step 1037 to the programs currently airing on those channels. In this way, the most popular programs published in step 1051 can include lists of the most popular programs, rather than merely a list of the most popular channels. In an embodiment, step 1049 comprises correlating the media usage data to currently airing or future scheduled media. After the real time viewing information 306 is aggregated and correlated, control is passed to step 1051.

In step 1051, the relative popularity of programs, channels, and currently airing rental assets being viewed within the defined user population are ranked and published as lists of "most popular" and "top picks" media based upon the data aggregation and correlation performed in step 1049. In this step, according to an embodiment, the "most popular" channels and programs are published to users by presenting an interactive GUI comprising a most popular POD menu 420 on display device 114. In an embodiment, step 1051 comprises presenting the current most popular rental assets in top picks POD menu 520 within the GUI displayed on display device 114. As discussed above with reference to FIGS. 4-9, the most popular and top picks lists are displayed in an interactive interface so that a user, using an input device, can scroll through the ranked channels, programs, and rental assets. As shown in FIGS. 5, 7, and 8, a user, using an input device, can also select, tune a ranked program or currently airing rental asset via the GUI. In an embodiment of the invention, step 1051 may report popularity of channels, programs and currently airing rental assets aggregated across all users or STBs 102 within the defined population of users. In another embodiment, the method may segregate the users into multiple separate groups, such as by geographic region or by demographic clustering, and separately aggregate and report popularity of channels, programs and currently airing rental assets to users based solely on usage within their defined group. In accordance with an embodiment, this step may report popularity of channels, programs and currently airing rental assets aggregated across all tiers of services offered by a provider, including for example, basic, extended basic or family, and premium tiers of service. However, as this embodiment may tend to bias popularity rankings for the most commonly available content, such as the over-the-air broadcast stations carried on the basic tier, in an alternative embodiment, step 1051 may report popularity segregated by tier, so that, for example, premium tier subscribers see the popularity of programs among subscribers to the same or a similar tier, providing a potentially more "fair" reflection of the popularity of premium content that is less widely available among the general population of users.

In another embodiment, step 1051 can comprise weighing different channels differently, in order to adjust for differences in availability of the various channels. For example, the viewership of each channel may be normalized based on the subscribership to that channel, so that the popularity rankings reflect the percentage of viewers with access to the channel who choose to watch it. This ranking approach may have the beneficial effect of highlighting to lower tier subscribers interesting content that is available with a higher tier subscription. This approach benefits the provider by promoting additional tiers of service, and benefits the consumer by helping them to identify and evaluate additional purchase options. Other embodiments may use a variety of alternative bases for normalization. For example, an alternative embodiment might normalize viewership of each channel to a baseline measure of its average or peak viewership, causing niche channels or programs that are exhibiting a "breakout" behavior to be highlighted. In an embodiment, average or peak viewership may be estimated or approximated.

In yet another embodiment, if the media usage data was correlated to future scheduled media in step 1049, step 1051 comprises ranking and publishing a guide to most popular programs in advance of their airing. By using the correlated usage data for previously-aired media obtained in step 1049, it is possible in step 1051 to provide a ranking of programs for upcoming timeslots. In this way, an embodiment of the method can provide a list of what is coming up in the future that is popular, wherein popularity is based upon usage data for previously aired media.

After the channels, programs, and currently airing rental assets are ranked and published, control is passed to step 1053 where the method ends.

Example Computer System Implementation

Figure 11:
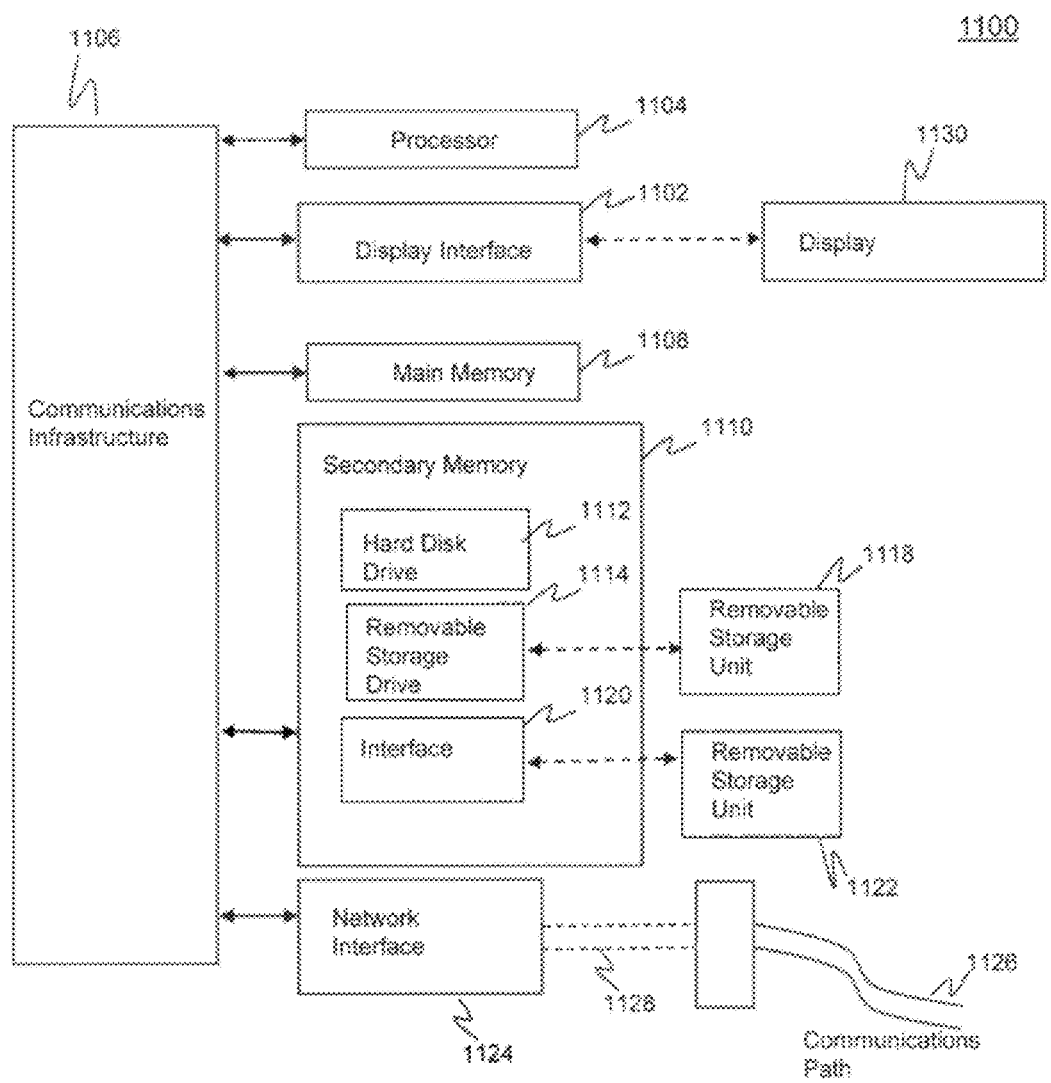
FIG. 11 is a block diagram of an exemplary computer system on which embodiments can be implemented.

Various aspects of the present invention can be implemented by software, firmware, hardware, or a combination thereof. FIG. 11 illustrates an example computer system 1100 in which the present invention, or portions thereof, can be implemented as computer-readable code. For example, the method illustrated by the flowchart 1000 of FIG. 10 can be implemented in system 1100. Systems 100, 200, and 300 of FIGS. 1, 2, and 3, respectively, can also be implemented in system 1100. Various embodiments of the invention are described in terms of this example computer system 1100. After reading this description, it will become apparent to a person skilled in the relevant art how to implement the invention using other computer systems and/or computer architectures.

Computer system 1100 includes one or more processors, such as processor 1104. Processor 1104 can be a special purpose or a general-purpose processor. Processor 1104 is connected to a communication infrastructure 1106 (for example, a bus, or network).

Computer system 1100 also includes a main memory 1108, preferably random access memory (RAM), and may also include a secondary memory 1110. Secondary memory 1110 may include, for example, a hard disk drive 1112, a removable storage drive 1114, flash memory, a memory stick, and/or any similar non-volatile storage mechanism. Removable storage drive 1114 may comprise a floppy disk drive, a magnetic tape drive, an optical disk drive, a flash memory, or the like. The removable storage drive 1114 reads from and/or writes to a removable storage unit 1118 in a well-known manner. Removable storage unit 1118 may comprise a floppy disk, magnetic tape, optical disk, etc. which is read by and written to by removable storage drive 1114. As will be appreciated by persons skilled in the relevant art(s), removable storage unit 1118 includes a non-transitory computer readable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 are in the form of signals, which may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link or other communications channels.

Computer system 1100 may additionally include computer display 1130. According to an embodiment, computer display 1130, in conjunction with display interface 1102, can be used to display the interactive UI depicted in FIGS. 4-9. Computer display 1130 may also be used to display a UI and media on display device 114.

In this document, the terms "computer program medium," "non-transitory computer readable medium," and "computer usable medium" are used to generally refer to media such as removable storage unit 1118, removable storage unit 1122, and a hard disk installed in hard disk drive 1112. Signals carried over communications path 1126 can also embody the logic described herein. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor 1104 to implement the processes of the present invention, such as the steps in the methods illustrated by flowchart 1000 of FIG. 10 and systems 100-300 of FIGS. 1-3 discussed above. Accordingly, such computer programs represent controllers of the computer system 1100. Where the invention is implemented using software, the software may be stored in a computer program product and loaded into computer system 1100 using removable storage drive 1114, interface 1120, hard drive 1112, or communications interface 1124.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for presenting media usage data, in a media delivery system, comprising:
   receiving, at a server, media usage data for currently airing media while the media is being aired;
   creating, at a server, an ordered list of a plurality of media channels or a plurality of media programs for presentation, wherein creating the ordered list further comprises:
      normalizing the usage data for each of the plurality of media channels or the plurality of media programs based at least in part on the number of subscribers with access to the media channel or media program; and
      ranking the relative popularity of the plurality of media channels or the plurality of media programs based on the normalized usage data; and
   presenting, in an interactive graphical user interface, the ordered list while the media is being aired.

2. The method of claim 1, wherein creating the ordered list further comprises:
   aggregating like media channels or like media programs; and
   ranking the popularity of the like media channels or like media programs based on their total aggregate viewership.

3. The method of claim 1, wherein the media usage data includes geographic data identifying at least two geographic areas where the currently airing media is being consumed, and
   wherein the ordering of the list comprises ranking the relative popularity of the plurality of media channels or the plurality of media programs within one or more geographic areas in the geographic data.

4. The method of claim 1, wherein the media usage data includes demographic data identifying demographic information for users consuming the currently airing media,
   and wherein the ordering of the list comprises ranking the relative popularity of the plurality of media channels or the plurality of media programs according to one or more characteristics in the demographic data.

5. The method of claim 1, wherein the media usage data for each of the plurality of media channels or the plurality of media programs is normalized based at least in part on an average or peak viewership of the media channel or media program.

6. The method of claim 1, wherein the ordering of the list further comprises:
   combining the media usage data with additional media data, and wherein the combining further comprises:
   ranking the relative popularity of the plurality of media channels or the plurality of media programs to produce a ranked list;
   and creating the ordered list from the ranked list and at least one of:
      removing at least one media channel or media program relative to the ranked list,
      reordering at least one media channel or media program relative to the ranked list,
      or adding at least one media channel or media program relative to the ranked list, based upon the additional media data.

7. The method of claim 6, wherein the additional media data comprises media preference data indicating media preferences for one or more users.

8. The method of claim 6, wherein the additional media data comprises one or more media channels or media programs to be at least one of included, excluded, prioritized, or deprioritized, for promotional purposes.

9. The method of claim 1, wherein the presenting comprises:
   correlating the plurality of media channels or plurality of media programs to channels displayed in a program guide; and
   sorting at least a subset of channels displayed within the program guide based upon the ordered list.

10. The method of claim 1, wherein the ordering of the list further comprises aggregating standard definition and high definition versions of a Channel and wherein the presenting further comprises:
    presenting a single entry for aggregated standard definition and high definition versions of a channel; and
    using information about a navigation device to tune the most appropriate version of the channel, when the single entry is selected by one or more users of the navigation device.

11. The method of claim 1, wherein the presenting comprises:
    correlating the plurality of media channels or the plurality of media programs to channels displayed by a navigation device; and
    modifying the channel-changing order for at least a subset of channels displayed by the navigation device, based upon the ordered list.

12. The method of claim 11, wherein the navigation device comprises a television.

13. The method of claim 11, wherein the navigation device comprises a set top box.

14. The method of claim 13, wherein the set top box is one or more of a cable set top box, a satellite set top box, or an IPTV set top box.

15. The method of claim 1, wherein creating the ordered list further comprises ranking the popularity of the plurality of media channels or the plurality of media programs based on total viewership.

16. The method of claim 1, wherein the currently airing media comprises at least 100 media channels or media programs.

17. A method for presenting media usage data, in a media delivery system, comprising:
  receiving, at a server, media usage data for previously aired media;
  correlating, at a server, the media usage data to currently airing or future scheduled media;
  creating, at a server, an ordered list of a plurality of media channels or a plurality of media programs for presentation, wherein creating the ordered list further comprises:
    normalizing the usage data for each of the plurality of media channels or the plurality of media programs based at least in part on the number of subscribers with access to the media channel or media program; and
    ranking the relative popularity of the plurality of media channels or the plurality of media programs based on the normalized usage data; and
  presenting the ordered list in an interactive graphical user interface.

18. The method of claim 17, wherein the media usage data includes geographic data identifying at least two geographic areas where the previously aired media was consumed, and
  wherein the ordering of the list comprises ranking the relative popularity of the plurality of media channels or the plurality of media programs within one or more geographic areas in the geographic data.

19. The method of claim 17, wherein the media usage data includes demographic data identifying demographic information for users consuming the previously aired media,
  and wherein the ordering of the list comprises ranking the relative popularity of the plurality of media channels or the plurality of media programs according to one or more characteristics in the demographic data.

20. The method of claim 17, wherein the media usage data for each of the plurality of media channels or the plurality of media programs is normalized based at least in part on an average or peak viewership of the media channel or media program.

21. The method of claim 17, wherein the ordering of the list further comprises combining the media usage data with additional media data, and wherein the combining comprises:
  ranking the relative popularity of the plurality of media channels or the plurality of media programs to produce a ranked list; and creating the ordered list from the ranked list and at least one of:
    removing at least one media channel or media program relative to the ranked list,
    reordering at least one media channel or media program relative to the ranked list,
    or adding at least one media channel or media program relative to the ranked list, based upon the additional media data.

22. The method of claim 21, wherein the additional media data comprises media preference data indicating media preferences for one or more users.

23. The method of claim 21, wherein the additional media data comprises one or more media channels or media programs to be at least one of included, excluded, prioritized, or deprioritized, for promotional purposes.

24. The method of claim 17, wherein the presenting comprises:
  correlating the plurality of media channels or plurality of media programs to channels displayed in a program guide; and
  sorting at least a subset of channels displayed within the program guide based upon the ordered list.

25. The method of claim 17, wherein the presenting comprises:
  correlating the plurality of media channels or the plurality of media programs to channels displayed by a navigation device; and
  modifying the channel-changing order for at least a subset of channels displayed by the navigation device, based upon the ordered list.

26. The method of claim 25, wherein the navigation device comprises a television.

27. The method of claim 25, wherein the navigation device comprises a set top box.

28. The method of claim 27, wherein the set top box is one or more of a cable set top box, a satellite set top box or an IPTV set top box.

29. The method of claim 17, further comprising:
  accepting a user selection of a media channel of the plurality of media channels or a media program of the plurality of media programs from the ordered list; and
  providing the selected media channel or media program from the ordered list to a navigation device upon which the ordered list appeared.

30. The method of claim 17, wherein the ordering of the list further comprises ranking the popularity of the plurality of media channels or the plurality of media programs based on total viewership.

31. A system for presenting media usage data, comprising:
  one or more computing devices;
  an agent implemented on the one or more computing devices, configured to receive media usage data for currently airing media while the media is being aired;
  a reporting module, implemented on the one or more computing devices, configured to create an ordered list of a plurality of media channels or a plurality of media programs for presentation, based at least in part on the media usage data, wherein the reporting module is further configured to:
    normalize the usage data for each of the plurality of media channels or the plurality of media programs based at least in part on the number of subscribers with access to the media channel or media program; and
    rank the relative popularity of the plurality of media channels or he plurality of media programs based on the normalized usage data; and
  a display device configured to present, in an interactive graphical user interface, the ordered list while the media is being aired.

32. The system of claim 31, wherein the reporting module is further configured to:
  combine the media usage data with additional media data; and
  rank the relative popularity of the plurality of media channels or the plurality of media programs to produce a ranked list; and creating the ordered list from the ranked list and at least one of:
  removing at least one media channel or media program relative to the ranked list,
  reordering at least one media channel or media program relative to the ranked list,
  or adding at least one media channel or media program relative to the ranked list, based upon the additional media data.

33. The system of claim 31, wherein the reporting module is further configured to:
  aggregate like media channels or like media programs; and
  rank the popular of the like media channels or like media programs based on their total aggregate viewership.

34. The system of claim 31, wherein the reporting module is further configured to aggregate standard definition and high definition versions of a channel and wherein the display device is further configured to:
  present a single entry for aggregated standard definition and high definition versions of a channel; and
  use information about a navigation device to tune the most appropriate version of the channel, when the single entry is selected by one or more users of the navigation device.

35. The system of claim 31, wherein the media usage data includes geographic data identifying at least two geographic areas where the currently airing media is being consumed, and
  wherein the reporting module is further configured to rank the relative popularity of the plurality of media channels or the plurality of media programs within one or more geographic areas in the geographic data.

36. The system of claim 31, wherein the media usage data includes demographic data identifying demographic information for users consuming the currently airing media,
  and wherein the reporting module is further configured to rank the relative popularity of the plurality of media channels or the plurality of media programs according to one or more characteristics in the demographic data.

37. The system of claim 31, wherein the reporting module is further configured to:
  correlate the plurality of media channels or plurality of media programs to channels displayed, by the display device, in a program guide; and
  sort at least a subset of channels displayed within the program guide based upon the ordered list.

38. The system of claim 31, further comprising:
  an input device configured to accept a user selection of a media channel of the plurality of media channels or a media program of the plurality of media programs from the ordered list, wherein the display device is further configured to display the selected media channel or media program.

39. The system of claim 31, wherein the reporting module is further configured to rank the popularity of the plurality of media channels or the plurality of media programs based on total viewership.

40. The system of claim 31, wherein the currently airing media comprises at least 100 media channels or media programs.

41. A media delivery system, comprising:
  one or more computing devices;
  an agent, implemented on the one or more computing devices, configured to receive media usage data for previously aired media, wherein the agent is further configured to correlate the media usage data to currently airing or future scheduled media;
  a reporting module, implemented on the one or more computing devices, configured to create an ordered list of a plurality of media channels or a plurality of media programs for presentation, based at least in part on the media usage data, wherein the reporting module is further configured to:
    normalize the usage data for each of the plurality of media channels or the plurality of media programs based at least in part on the number of subscribers with access to the media channel or media program; and
    rank the relative popularity of the plurality of media channels or the plurality of media programs based on the normalized usage data; and
  a display device configured to present the ordered list in an interactive graphical user interface.

42. The method of claim 1, further comprising:
  accepting a user selection of a media channel of the plurality of media channels or a media program of the plurality of media programs from the ordered list; and
  providing the selected media channel or media program from the ordered list to a navigation device upon which the ordered list appeared.

\* \* \* \* \*

UNITED STATES PATENT AND TRADEMARK OFFICE
CERTIFICATE OF CORRECTION

Page 1 of 1

PATENT NO. : 9,118,432 B2
APPLICATION NO. : 13/077700
DATED : August 25, 2015
INVENTOR(S) : Donoghue et al.

It is certified that error appears in the above-identified patent and that said Letters Patent is hereby corrected as shown below:

In the claims

Column 24, line 56, please replace, "or he plurality" with --or the plurality--.

Signed and Sealed this
Twenty-third Day of February, 2016

Michelle K. Lee
*Director of the United States Patent and Trademark Office*